US012586575B1

(12) United States Patent
Kachuee et al.

(10) Patent No.: US 12,586,575 B1
(45) Date of Patent: Mar. 24, 2026

(54) UPDATING AN ARTIFICIAL INTELLIGENCE SYSTEM

(71) Applicant: Amazon Technologies, Inc., Seattle, WA (US)

(72) Inventors: Mohammad Kachuee, Bellevue, WA (US); Vaibhav Kumar, Redmond, WA (US); Xiang Li, Bellevue, WA (US); Puyang Xu, Issaquah, WA (US); Xiaohu Liu, Bellevue, WA (US); Xing Fan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 18/613,677

(22) Filed: Mar. 22, 2024

(51) Int. Cl.
　　*G10L 15/18* 　　(2013.01)
　　*G10L 15/06* 　　(2013.01)
　　*G10L 15/22* 　　(2006.01)
(52) U.S. Cl.
　　CPC ........ *G10L 15/1815* (2013.01); *G10L 15/063* (2013.01); *G10L 15/22* (2013.01); *G10L 2015/0635* (2013.01); *G10L 2015/223* (2013.01)

(58) Field of Classification Search
　　CPC ... G10L 15/1815; G10L 15/063; G10L 15/22; G10L 2015/0635; G10L 2015/223
　　See application file for complete search history.

(56) References Cited

U.S. PATENT DOCUMENTS

| | | | | |
|---|---|---|---|---|
| 12,406,013 | B1 * | 9/2025 | Nadig | G10L 15/22 |
| 2024/0290327 | A1 * | 8/2024 | Byrne | G06F 3/167 |
| 2025/0103962 | A1 * | 3/2025 | Turley | G06N 5/02 |
| 2025/0139088 | A1 * | 5/2025 | Weik | G06F 16/256 |

* cited by examiner

*Primary Examiner* — Abul K Azad
(74) *Attorney, Agent, or Firm* — Pierce Atwood LLP

(57) ABSTRACT

Techniques for improving query generation (or generation of an input to another component) by a language model are described. In some embodiments, the generated query is used to retrieve API calls relevant for responding to a user input. The language model can be finetuned using language model generated queries. Results retrieved using the generated query are evaluated against ground truth data to determine performance metrics data, which may be based on a ranking of the ground truth API call in the retrieved results. Based on the performance metrics data, training data including the generated query can be used to update/finetune the language model may be determined. Updating of the language model may be initiated based on feedback corresponding to the generated query.

20 Claims, 13 Drawing Sheets

Figure 2:
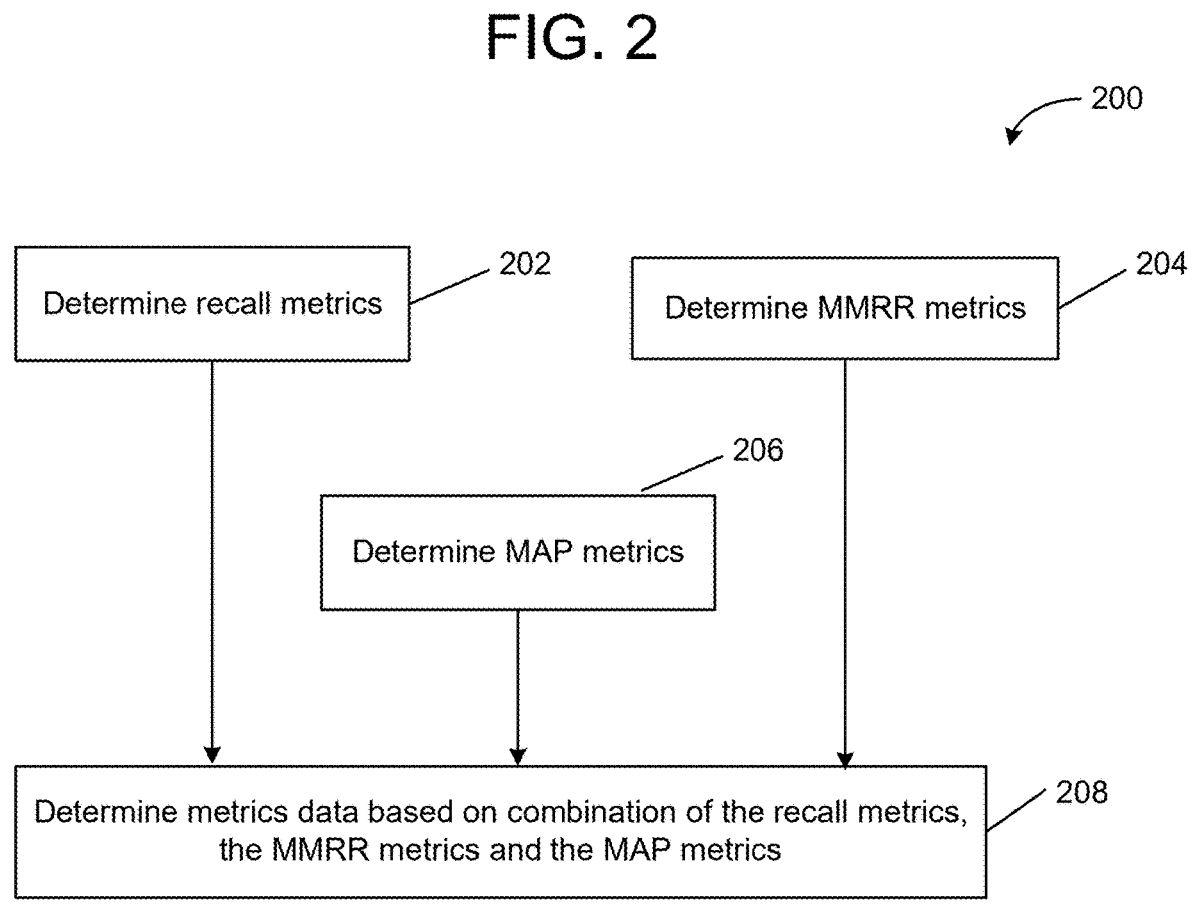

Determine recall metrics — 202

Determine MMRR metrics — 204

Determine MAP metrics — 206

Determine metrics data based on combination of the recall metrics, the MMRR metrics and the MAP metrics — 208

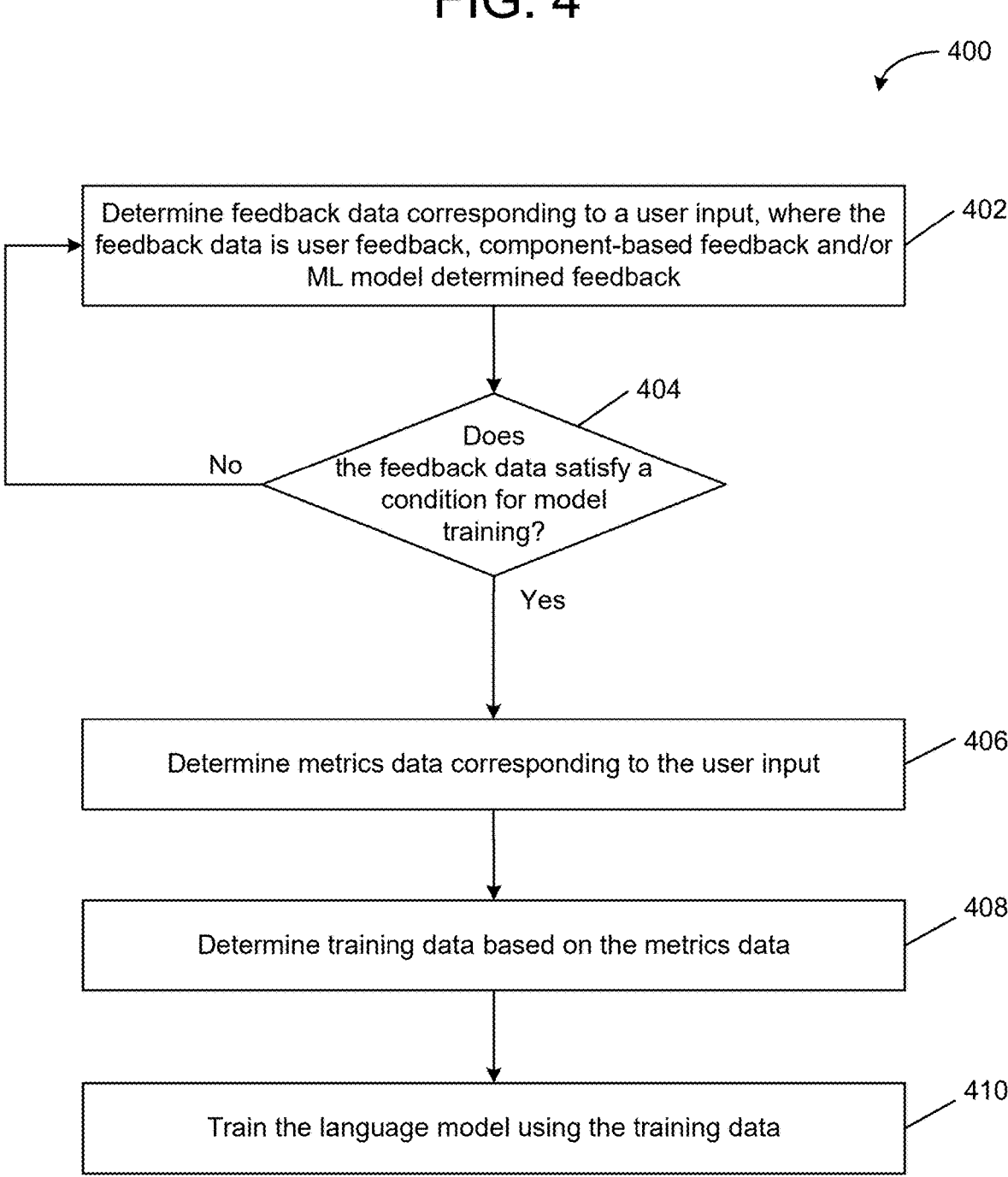

400

Determine feedback data corresponding to a user input, where the feedback data is user feedback, component-based feedback and/or ML model determined feedback — 402

Does the feedback data satisfy a condition for model training? — 404

No

Yes

Determine metrics data corresponding to the user input — 406

Determine training data based on the metrics data — 408

Train the language model using the training data — 410

FIG. 11

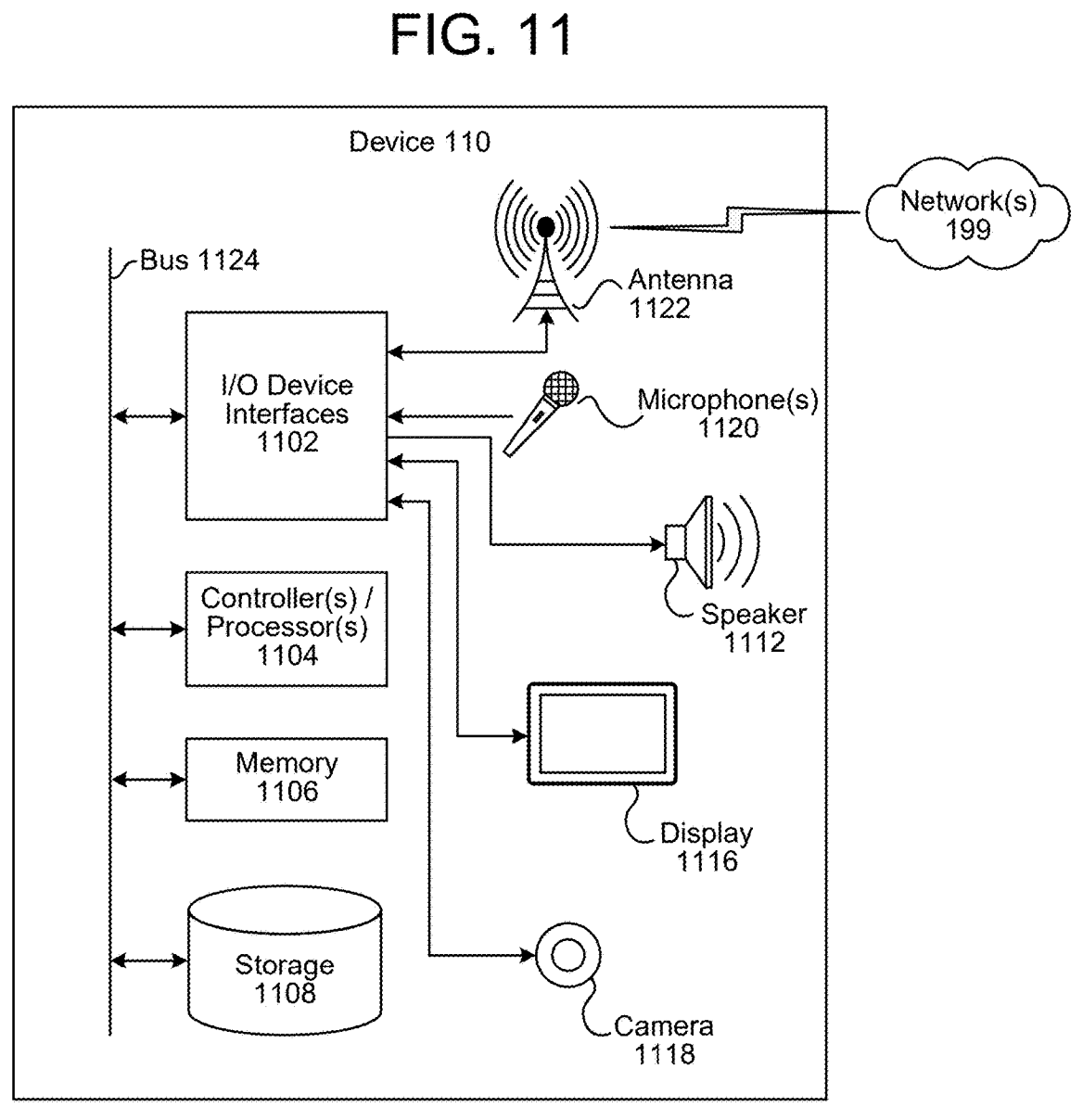

Network(s)
199

Device 110

Antenna
1122

Microphone(s)
1120

Speaker
1112

Display
1116

Camera
1118

Bus 1124

I/O Device
Interfaces
1102

Controller(s) /
Processor(s)
1104

Memory
1106

Storage
1108

FIG. 12

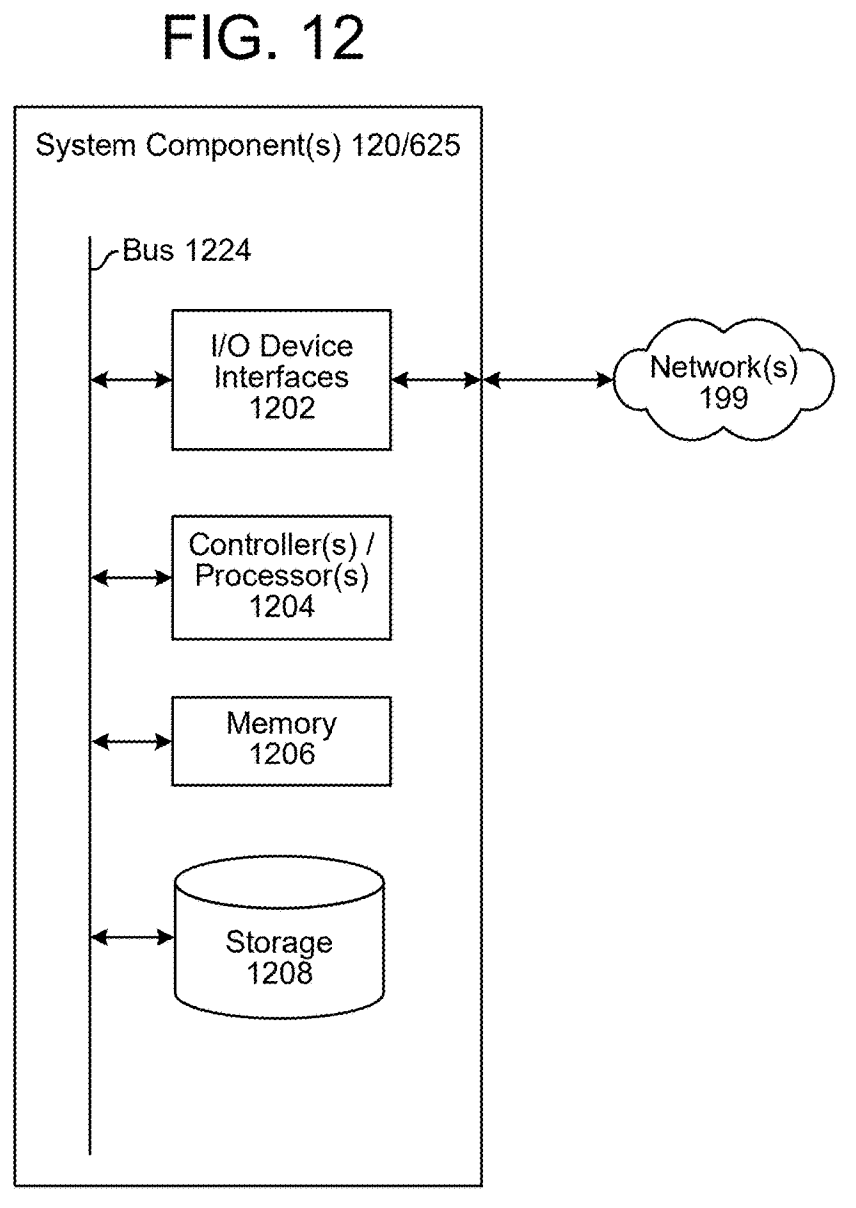

System Component(s) 120/625

Bus 1224

Network(s)
199

I/O Device
Interfaces
1202

Controller(s) /
Processor(s)
1204

Memory
1206

Storage
1208

UPDATING AN ARTIFICIAL INTELLIGENCE SYSTEM

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating example components and processing of a system for determining metrics corresponding to a query generated by a language model and updating the language model based on the metrics, according to embodiments of the present disclosure.

FIG. 2 is a flowchart illustrating an example process for determining the metrics corresponding to the query, according to embodiments of the present disclosure.

FIG. 3 is a conceptual diagram illustrating example components and processing for determining feedback data corresponding to the query generated by the language model, according to embodiments of the present disclosure.

FIG. 4 is a flowchart illustrating an example process for updating the language model based on the feedback data, according to embodiments of the present disclosure.

FIG. 11 is a block diagram conceptually illustrating example components of a device, according to embodiments of the present disclosure.

FIG. 12 is a block diagram conceptually illustrating example components of a system, according to embodiments of the present disclosure.

DETAILED DESCRIPTION

Figure 5:
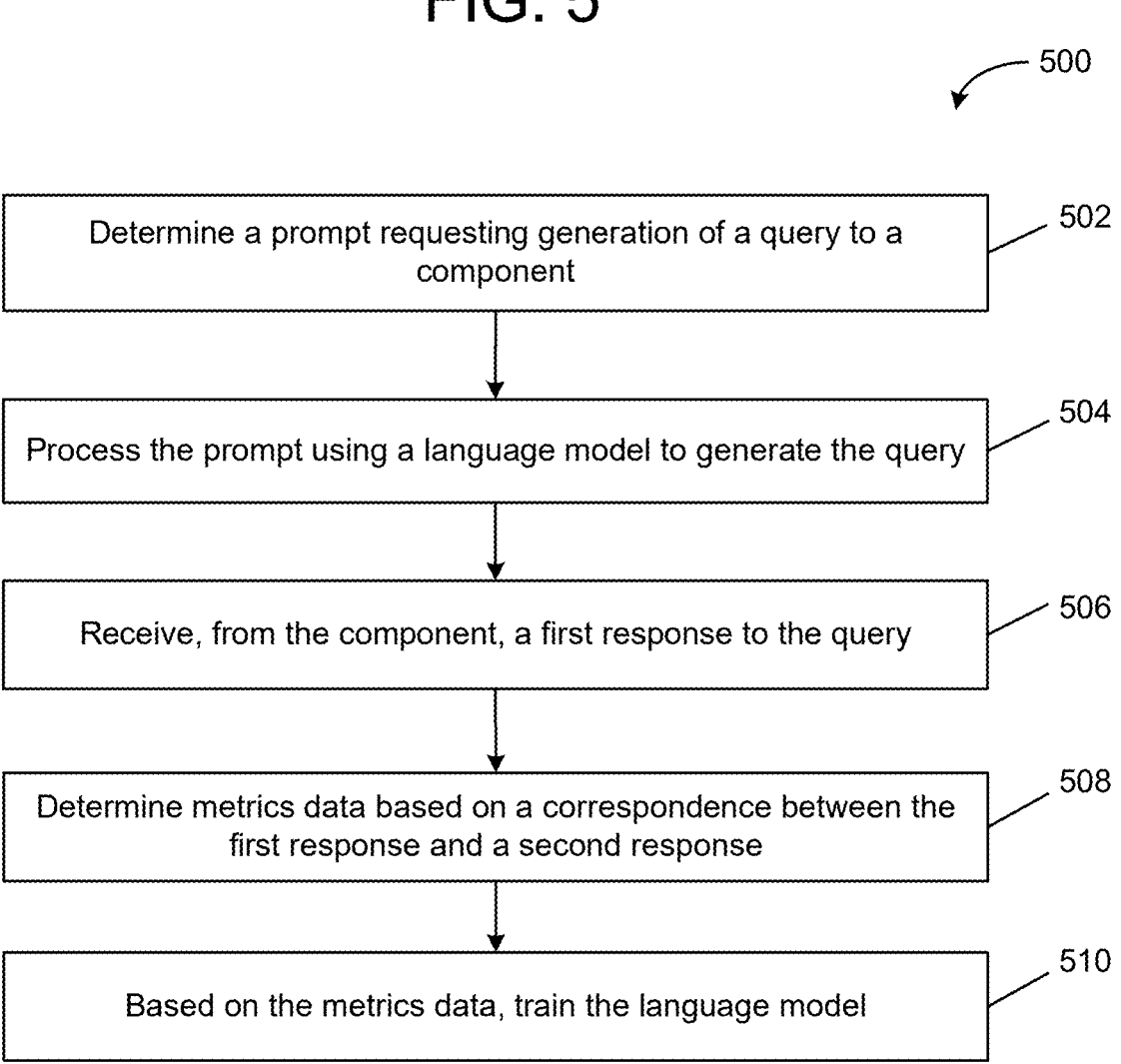
FIG. 5 is a flowchart illustrating an example process for determining metrics corresponding to a query generated by a language model and updating the language model based on the metrics, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech.

Language modeling is the use of various statistical and probabilistic techniques to determine the probability of a given sequence of words occurring in a sentence. Language models analyze bodies of text data to provide a basis for their word predictions. The language models are generative models. In some embodiments, one or more of the language models may be a large language model (LLM). A language model (e.g., LLM) is an advanced artificial intelligence system designed to process, understand, and generate human-like text based on relatively large amounts of data. In some embodiments, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses an expansive training dataset, as compared to a relatively smaller language model, and can include a relatively large number of parameters (in the range of billions, trillions or more), hence, they are called "large" language models. In some embodiments one or more of the language models (and their corresponding operations, discussed herein below) may be the same language model.

An artificial intelligence (AI) system may use ASR, NLU, NLG, and/or TTS, each with and/or without a language model, for processing user inputs, including natural language inputs (e.g., typed and spoken inputs) and other type of inputs (e.g., inputs not received from a user, inputs received from a system component, inputs representing occurrence of events, etc.).

In some embodiments (e.g., where one or more of the language models are LLMs), the one or more language models may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. Examples of such language models include some of the Amazon Alexa and AWS Titan family of generative models.

In other embodiments (e.g., where one or more of the language models are an LLM), the one or more language models may be a decoder-only architecture. The decoder-only architecture may use left-to-right (unidirectional) encoding of the input (e.g., audio, text, image, video, etc.). Examples of such language models include others in the Amazon Alexa and AWS Titan family of models as well as the Generative Pre-trained Transformer 3 (GPT-3) and other versions of GPT. GPT-3 reportedly has a capacity of (approximately) 175 billion machine learning parameters.

Other examples of language models (e.g., LLMs) include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models instead of or in addition to the language model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments (e.g., where the language model(s) is an LLM), the input to the language model may be in the form of a prompt. A prompt may be a natural language input, for example, a directive or request, for the language model to generate an output according to the prompt. The output generated by the language model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the language model may output a recipe (e.g., a step-by-step process represented by text, audio, image, video, etc.) to cook rice. As another example, for an example prompt "I am hungry. What restaurants in the area are open?", the language model may output a list of restaurants near the user that are open at the time of the user prompt.

The language models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require less training data than implementing other fine-tuning techniques. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning of other data.

Certain AI systems may be configured to respond to natural language (e.g., spoken or typed) user inputs. For example, in response to the user input "what is today's weather," the system may output weather information for the user's geographic location. As another example, in response to the user input "lock the front door," the system may actuate a "front door" smart lock to a locked position. As a further example, a user may initiate a dialog (e.g., involving multiple user inputs, requesting performance of multiple actions, etc.) such as "I need to go to Seattle next week. Can you help me find a hotel and a flight?" and the system may find and reserve a hotel room and a flight to Seattle and output information of the reserved hotel and flight.

A system may receive a user input as speech. For example, a user may speak an input to a device and the device or the system may perform ASR processing on audio data, representing the spoken input, to generate ASR data (e.g., text data, token data, etc.) representing the spoken input. The system (or the device) may perform processing on the ASR data to determine an action responsive to the user input.

In some embodiments, the system may be configured to process the ASR data (or other type of data representing another type of user input) using a language model(s) to determine the action responsive to the user input. For example, in response to the user input "Please plan a 4-person trip to [Location] from [Date 1] to [Date 2]," the system may use the language model(s) to generate one or more tasks associated with booking the trip (e.g., (1) find a flight from the user's location to [Location] leaving on [Date 1] and returning on [Date 2]; and (2) find a hotel in [Location] between [Date 1] and [Date 2]) and select a task of the one or more tasks to be performed first (e.g., (1) find a flight ticket leaving the user's location on [Date 1] and returning on [Date 2].) The system may determine one or more components (e.g., a skill component, a LLM agent component, etc.) configured to perform action(s) associated with a task.

Application programming interfaces (APIs) are a way for one program/component to interact with another. API calls are the medium by which they interact. An API call, or API request, is a message sent to a system component asking an API to perform an action, provide a service or information, or the like. An API call may be formatted for the particular API and may include a particular request, optionally using particular arguments and argument values. API calls may be used for a variety of purposes, such as controlling other devices (e.g., an API call of turn_on_device (device="indoor light 1") corresponds to a directive/request to a component to turn on a device associated with the identifier "indoor light 1"), obtaining information from other components (e.g., an API call of InfoQA.question ("Who is the president of USA?") corresponds to a directive/request to a component to find and provide an answer to the indicated question), and performing other actions (e.g., generating synthesized speech, searching data sources, etc.).

The language model(s) may generate an output indicating one or more application programming interface (API) calls requesting performance of one or more actions by one or more components corresponding to the user input and/or current task. The system may execute the API calls and the language model(s) may receive an API response(s) from the component(s) for further processing. The system may also determine another API call to perform a next task (e.g., find a hotel in [Location] between [Date 1] and [Date 2]) of the one or more tasks). Thereafter, the language model(s) may generate a response informing the user of the action(s) that are performed or that are to be performed.

In some embodiments, the system may include an API retrieval component configured to receive a search query and output one or more API calls (or API data) matching the search query. API data may include an API call, API description, component description, and other information associated with the API call. In some embodiments, a language model of the system may generate an action to be performed with respect to the user input, where the action may be represented as an action description, an API, an API description, etc. Based on the generated action, the system may use the API retrieval component to determine one or more APIs available to perform the generated action. For example, in response to the user input "book a flight", the language model may generate the action "I need to find an API to book flight" or "I need to book a flight using Book.flight ([Departure], [Arrival])." Based on the generated action, the system may search the API retrieval component to determine one or more API calls corresponding to booking a flight (e.g., Bookflight.location ("departing airport code", "arrival airport code"), Bookflight.date ("departing date"), bookflight.rountrip ("departing location", "arrival location", "departure date", "return date"), Airline-BookFlight ("departing airport code", "arrival airport code"), etc.). Based on the user input and other information (e.g., context data corresponding to the user input, user preferences, past user interactions, further information received from user, etc.), the system may select one or more of the determined API calls to execute.

The present disclosure provides, among other things, techniques to improve query generation by a language model, where the query is used to retrieve API calls relevant for responding to a user input. In some embodiments, the techniques involve updating (e.g., further training, finetuning, etc.) the language model based on evaluating a generated query with respect to search results corresponding to the query. For example, based on a user input, the language model may be prompted to generate a query to retrieve API calls for responding to the user input, the query may be used to retrieve a ranked list of API calls from the API retrieval component, and the ranked list may be evaluated (e.g., compared with, scored, etc.) in view of an API call (e.g., ground truth API call) corresponding to the action requested by the user input.

In some embodiments, as part of the evaluation, the system may determine performance metrics data corresponding to the ranked list and the ground truth API call. Training data may be determined based on the metrics data and the language model may be trained/finetuned using the training data. In examples, the training data includes associations between the query generated by the language model and the user input to represent (positive or negative) samples of user inputs and corresponding search queries. The performance metrics data may involve determining whether or not the ground truth API call is included in the search results list and may involve determining a rank associated with the ground truth API call in the search results list.

In some embodiments, the process of evaluating a query generated by the language model may be initiated based on feedback associated with a corresponding user input, output presented based on the generated query, or the like. The feedback may be feedback from a user(s), feedback from a system component(s) that responded to an API call, feedback determined using a machine learning model(s), or feedback from other sources.

Techniques described herein can be used to improve generation, by a language model, of a query or other type of input to a component. For example, similar techniques can be used to improve language model generation of a query to a knowledge base (or a question-answer system, etc.), where the language model is prompted with a user input and the language model generates a query for input to the knowledge base to determine a response corresponding to the user input.

Techniques described herein provide, among other things, improvements to language model (e.g., LLM) functionality by using language model generated outputs (e.g., queries, inputs for other components) to finetune the language model.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1:
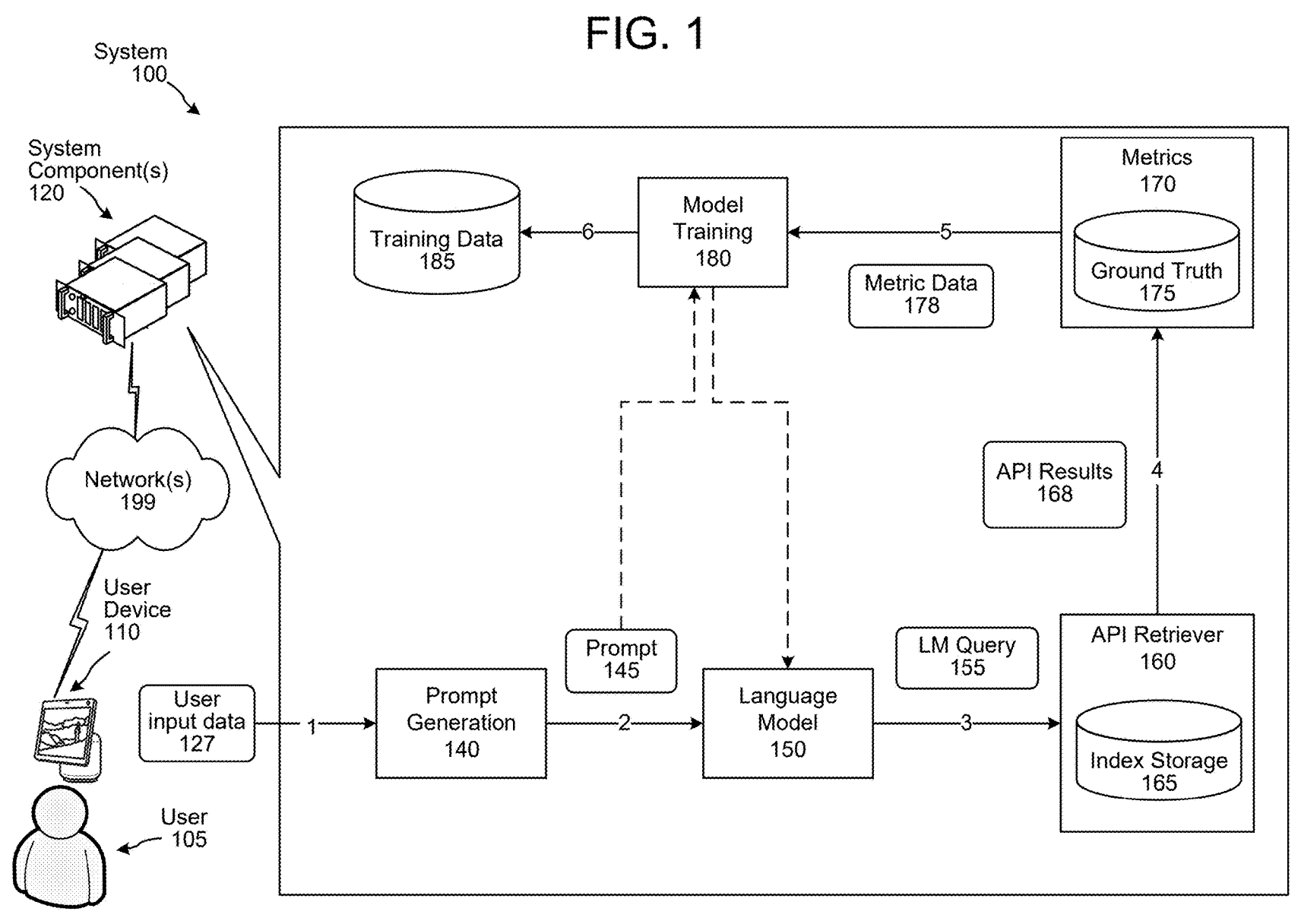

FIG. 1 is a conceptual diagram illustrating example components and processing of a system 100 for determining metrics corresponding to a query generated by a language model and updating the language model based on the metrics, according to embodiments of the present disclosure. As shown in FIG. 1, the system 100 may include a user device 110, local to a user 105, and a system component(s) 120 connected, to the user device 110, across one or more networks 199. The network(s) 199 may include the Internet and/or any other wide or local area network, and may include wired, wireless, and/or cellular network hardware. Although the figures and discussion of the present disclosure illustrate certain components and steps in a particular order, the components may be implemented in a different manner (as well as certain components removed or added) and the steps described may be performed in a different order (as well as certain steps removed or added) without departing from the present disclosure.

The system component(s) 120 may include one or more processing components configured to process user inputs and other type of inputs (e.g., sensor data, audio data, data indicative of an event occurring, etc.) received via the user device 110. In example embodiments, the system component(s) 120 may process spoken inputs using ASR processing. The system component(s) 120 may also be configured to process non-spoken inputs, such as gestures, textual inputs, selection of GUI elements, selection of device buttons, etc. The system component(s) 120 may also include other components to understand an input, determine an action to be performed in response to receiving the input, generate an output responsive to the input, and the like. Such other components may perform NLU processing, TTS processing, other components to facilitate user input processing, some of which are described below in relation to FIG. 10.

In some cases, the user 105 may speak an input, and the user device 110 may capture audio representing the utterance. The user device 110 may send audio data to the system component(s) 120 for processing and/or may process the audio data using the user device 110. Using ASR processing, the audio data may be processed to determine a transcription of the spoken input (e.g., ASR data including text/token data).

In other cases, the user 105 may enter an input via a touchscreen display of the user device 110, a keyboard and/or mouse of the user device 110, or the like. The entered input may be a natural language input, may be a selection of a GUI element, etc. In yet other cases, the user 105 may provide a gesture input, which may be captured by a camera of the user device 110.

In any case, the user input may be processed to determine user input data 127. In the case of a spoken or typed natural language input, the user input data 127 may be text or token data representing the natural language input. For example, the user input data 127 may be "Show me today's weather" or "Turn on the lights and set the thermostat to [temperature]." In case of the other types of input, the user input data 127 may be text or token data indicative of the user input. For example, for a gesture input of nodding head, the user input data 127 may be "head nod" or "yes". As another example, for a selection of a GUI element corresponding to a movie title, the user input data 127 may be "selection of [movie title]" or "user selected [movie title] for playback."

In some embodiments, the system may receive input data, which may be processed in a similar manner as the user input data 127 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 110, a user entering the home, etc.) and other types of events. In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a user device 110 (e.g., a smartphone, a smart speaker, etc.) to present an alert to the user.

In some embodiments, the system component(s) 120 may include a prompt generation component 140, a language model 150, an API retriever component 160, a metrics component 170, and a model training component 180.

The prompt generation component 140 may be configured to generate prompts for the language model 150. The API retriever component 160 may be configured to receive an input, for example, a search query, and determine one or more API calls (or API data), from an index storage 165, corresponding to the input. The metrics component 170 may be configured to evaluate the API call(s) determined by the API retriever component 160 in view of stored data (e.g., ground truth data) corresponding to the user input data 127 and determine corresponding metrics data. The model training component 180 may be configured to determine training data based on the metrics data and may facilitate training of the language model 150.

Referring to the processing that may be performed by the system component(s) 120, the prompt generation component 140 may receive (step 1) and process the user input data 127 to generate a prompt 145 based on the user input data 127. The prompt 145 may be a request to a language model 150 to determine one or more actions to be performed based on the user input data 127. In some embodiments, the prompt 145 may include the user input data 127 or a representation of the user input. The user input may be associated with an indicator (e.g., a label, tokens, etc.) representing that the tokens following the indicator are the user input. In some examples, the prompt 145 may request the language model 150 to generate a query to be inputted to an API retriever component 160. An example prompt may be: {Find actions that will fulfill the below user request. You can generate a query for an API search. User input: "Book a flight to Seattle."}

In some embodiments, the prompt 145 may include context data corresponding to the user input. The context data may be user context, device context, environmental context, etc. The context data may be personalized context data 667 (shown in FIG. 6) or context data 705 (shown in FIG. 7) described below.

User context may include user location, user profile identifier, user demographics, user profile data, user preferences, personalized catalogs, enabled skills/applications, etc. Device context may include device type, device identifier, device location (e.g., living room, kitchen, office, etc.), device capabilities, device state, etc.), device capabilities, device status, etc. Environmental context may include time/date the user input is received/processed, device that received the user input, objects proximate to the device/user, background audio/noises, state/status of device(s) in the user's environment (e.g., TV is on, thermostat temperature, etc.), etc.

The language model 150 may be a pretrained/existing language model and may receive (step 2) the prompt 145. Based on processing the prompt 145, the language model may generate an output/tokens, for example, a language model (LM) query 155. The LM query 155 may be a natural language output and in some examples may be a search query for the API retriever component 160. For example, the LM query 155 may be "API calls for flight booking" or "book flight from [user location] to Seattle." In other examples, the LM query 155 may include additional details to retrieve more relevant API calls from the API retriever component 160, such as departure date, return date (if a roundtrip booking is requested), airline name (if user has a preferred airline), layover status (e.g., non-stop, one layover, etc.) and the like.

Where the prompt 145 includes more than one action to be performed, for example, the user input data 127 corresponds to performance of more than one action, the LM query 155 may be a search query for API calls to cause performance of the more than one actions. For example, the user input may be "I need to plan a trip to Seattle for the weekend", the LM query 155 may be a request to search for an API call(s) for booking a flight and to search for an API call(s) for booking a hotel.

In some embodiments, the language model 150 may generate an output/tokens in addition to the LM query 155. The language model 150 may process the prompt 145 and may generate tokens representing its understanding of the user input and other information that may be relevant for processing the user input. For example, the language model 150 may output "User wants to book a flight to Seattle likely departing from [user location]. I need to find API calls to help with the booking." In this example, the language model 150 may determine the [user location] from the context data included in the prompt 145.

The API retriever component 160 may receive (step 3) the LM query 155 and may search the index storage 165 for API calls corresponding to the LM query 155. The API retriever component 160 may include the index storage 165 or may be in communication with the index storage 165.

The index storage 165 may store various information associated with multiple APIs that are supported/available for the system 100. In example embodiments, the index storage 165 may be a search index including structured data that can be searched to retrieve results that are relevant to a specific query. The index storage 165 may be configured for a particular information retrieval method and/or a particular search algorithm. The index storage 165 may store information (e.g., API data) associated with individual API calls (where an API call refers to an API name, arguments and argument values); such information may be a description of the API call (e.g., an action that can be performed using the API call, an input(s) used to perform the action, a response received from the API, etc.), API call arguments (e.g., parameters/inputs for executing the API call, the type of data/values that can be provided, etc.), a response type received (e.g., data type, data format, etc.), a responding component 850 that the API call may be used with (e.g., a component identifier), and the like. The information stored in the index storage 165 may be provided by a developer, a system administrator, or the like.

The API retriever component 160 may be configured to retrieve one or more API calls (e.g., API results 168) relevant to the LM query 155. In some examples, the API retriever component 160 may retrieve top-k relevant API calls. In some examples, the API results 168 may be a ranked list of API calls relevant to the LM query 155. The API retriever component 160 may use retrieval-based approaches to retrieve the API results 168 from the index storage 165. For example, the API retriever component 160 may compare the LM query 155 to the information included in the index storage 165 and may retrieve API calls (or API data) that are semantically similar and/or lexically similar to the LM query 155.

In example embodiments, the API retriever component 160 (or another system component) may determine and compare an encoded representation of the LM query 155 to an encoded representation of API information in the index storage 165 to determine whether the API call is similar (e.g., based on cosine similarity techniques) to the LM query 155. If a similarity value satisfies a condition (e.g., meets a threshold value), the API call (and optionally other information) may be included in the API results 168.

In some embodiments, the index storage 165 may also include a component identifier (e.g., component name) associated with individual responding components 850, a component description, historical accuracy/defect rate associated with an API call, a hit rate associated with an API call, one or more exemplars representing use of an API call (e.g., an example user input, corresponding API call, example API output, etc.), etc. One or more of the foregoing data information may be included in the API results 168.

The API retriever component 160 may send (step 4) the API results 168 to the metrics component 170. The metrics component 170 may include ground truth storage 175 or may be in communication with the ground truth storage 175.

The ground truth storage 175 may store information representing one or more API calls (e.g., correct API calls, ground truth API calls, API calls that result in a desired response to a user input, etc.) corresponding to a user requested action/user input. The ground truth storage 175 may store an association between an individual action and an API call(s). The action may be text data, tokens, etc. and may correspond to a group of user inputs that request the same/similar action. An example action of "book flight for departure city to arrival city" may be correspond to example user inputs "I need to travel to [city]", "Book a flight from [first city] to [second city]", "search for flights between [first city] and [second city]", etc. The API call, in the ground truth storage 175, may be represented as the API call or an identifier associated with the API call.

In addition to the API results 168, the metrics component 170 may also receive the user input data 127. In some embodiments, the metrics component 170 may search the ground truth storage 175 to retrieve a record including an action matching (e.g., semantically similar, lexically similar, etc.) the user input data 127. Using the retrieved record, the metrics component 170 may determine a ground truth API(s) corresponding to the user input data 127.

In examples where the user input data 127 requests performance of more than one action, the metrics component 170 may retrieve multiple records matching the individual requested actions. For example, if the user input requests a first action and a second action, the metrics component 170 may retrieve a first record corresponding to the first action and a second record corresponding to the second action. In other examples, the ground truth storage 175 may store a record including more than one action (e.g., actions that are likely to be requested/performed together), and the metrics component 170 may retrieve such a record based on including the multiple actions requested in the user input data 127. Such records may include multiple API calls corresponding to the multiple actions.

Using the determined ground truth API call(s), the metrics component 170 may evaluate the API results 168 and determine metrics data 178. The metrics data 178 may correspond to performance of the language model 150 in generating queries for the API retriever component 160. The metrics data 178 may indicate better (high) performance of the language model 150 when the language model 150 generates a query based on a user input that results in retrieval of an API call (ground truth API call) that corresponds to the user input. On the other hand, the metrics data 178 may indicate worse (low) performance of the language model 150 when the generated query does not result in retrieval of an API call (ground truth API call) that corresponds to the user input. In some examples, the metrics data 178 may be based on whether or not the ground truth API(s) are included in the API results 168. In some examples, the metrics data 178 may be based on a ranking of the ground truth API(s) in the API results 168, when the API results 168 includes a ranked list of API calls. For example, the metrics data 178 may indicate better performance based on the ground truth API being the first ranked API call result, while the metrics data 178 may indicate worse performance based on the ground truth API call being the last ranked API call result or not being included in the API results 168.

In some embodiments, the metrics data 178 may be a numerical value (e.g., a score) and if the numerical value satisfies a condition then high, medium or low performance of the language model 150 may be determined. For example, if the numerical value satisfies a high performance threshold value, then high performance of the language model may be determined.

In some embodiments, the metrics component 170 may consider the problem of retrieving API calls for complex user requests. A complex user request may require a higher level of common-sense and semantic understanding by the language model 150. A complex user request may be ambiguous or may involve invoking multiple API calls. For example, a user input such as "I'm bored and tired of staying home. I don't want to watch tv anymore. Give me some ideas for what to do". In this case, the language model 150 may generate a query to retrieve a list of API calls that are related to outdoor activities.

The metrics component 170 may determine the metrics data 178 using one or more techniques. FIG. 2 is a flowchart of an example process 200 that may be performed by the metrics component 170 to determine the metrics data 178. In some embodiments, the metrics component 170 may determine three types of metrics: recall metrics, Multiple Mean Reciprocal Rank (MMRR), and Mean Average Precision (MAP) (see below). The foregoing metrics may consider retrieval of multiple relevant API calls from the API retriever component 160. Other metrics may also be used.

At a step 202, the metrics component 170 may determine recall metrics. In some embodiments, the recall metrics may be determined for a particular rank (X). For illustration and explanation purposes and assuming that the user input is a complex request needing multiple API calls, a ranked list of API calls included the API results 168 is represented as $|h|=k$ and a ground truth set of relevant API calls is represented as $|y|=n$, where $1 \leq n \leq k$ is the total number of relevant items for the specific sample. Assuming $rel(x_i, y)$ is an indicator function that is set to 1 if $x$; is in the set of relevant items $y$ and zero otherwise. Recall at rank X may be defined as:

$$\text{Recall}@X = n_1 \times \Sigma_i = 1 X \text{rel}(h_i, y)$$

With this definition of recall, the metrics data 178 may represent, given a cut-off at X, what percentage of relevant items would be retrieved in the set of X retried items. At a step 204, the metrics component 170 may determine MMRR metrics. In some embodiments, MMRR metrics may be a version of Mean Reciprocal Rank (MRR) metrics, such that MMRR considers cases where multiple relevant items are present in the retrieved results. MMRR may be defined as follows:

$$\text{MMRR} = n_1 [\Sigma i = k \ k_i \times rel(h_i, y) + (k+1)(n - \Sigma i = 1 k rel(h_i, y))]2n$$

With the above definition, MMRR may reach "1" for perfect retrieval of all relevant items and is gradually reduced when the retrieval quality degrades. In the numerator, there is an average rank position for perfect retrieval of n items. In the denominator, the average rank position is computed for retrieved relevant items while clipping the tail by considering any missing item in the set of k retrieved items to appear at rank k+1. MMRR may measure the average rank where the relevant items appear in the ranked list normalized by the best case where all top results are relevant items.

At a step 206, the metrics component 170 may determine MAP metrics. The MAP metrics may be defined as:

$$MAP = n_1 \times \Sigma i = 1 k_i \Sigma j = 1 \text{irel}(h_i, y) \times rel(h_i, y)$$

In the above, the first term in the outer summation is precision at rank i. MAP metrics for perfect ranking may be the value of 1, may become smaller values as relevant items appear further down/low ranked in the retrieved list, and may reach 0 when no relevant item is retrieved in the top k.

At a step 208, the metrics component 170 may determine the metrics data 178 based on a combination of the recall metrics, the MMRR metrics and the MAP metrics. In some embodiments, the metrics data 178 may be an aggregation of the three metrics (e.g., a sum). In some embodiments, the metrics data 178 may be an average (e.g., a mean, a weighted average, a median, etc.) of the three metrics. In some embodiments, the metrics data 178 may be one of the three metrics (e.g., the best/highest performance metrics, the MMRR metrics if non-zero, etc.).

In some embodiments, the metrics data 178 may be based on one (first) API call being retrieved from the API retriever component 160 and a correspondence (e.g., matching, lexical similarity, etc.) between the first API call and a ground truth (second) API call.

Referring to FIG. 1 again, the metrics component 170 may send (step 5) the metrics data 178 to the model training component 180. The model training component 180 may determine training data based on the metrics data 178 and may store (step 6) the training data in training data storage 185.

In some embodiments, the model training component 180 may determine the training data based on the metrics data 178 satisfying a condition corresponding to model performance. In some embodiments, the model training component 180 may determine training data to include the prompt 145 and the LM query 155, for example, an association between the prompt 145 and the LM query 155. In some embodiments, the training data may be associated with a label indicative of the training data being a positive sample, a neutral sample or a negative sample. The model training component 180 may determine the label based on the metrics data 178. For example, if the metrics data 178 indicates high performance of the language model 150, then the model training component 180 may determine the training data to include the prompt 145, the LM query 155 and a positive sample label. As another example, if the metrics data 178 indicates low performance of the language model 150, then the model training component 180 may determine the training data to include the prompt 145, the LM query 155 and a negative sample label.

The training data storage 185 may be used to update, for example, further train, finetune, etc., the language model 150. The training data may represent a sample LM query to be generated for a sample prompt, and thus the language model 150 may learn, from the training data, how to generate queries based on given prompts so that the queries result in retrieval of API calls that are relevant for the prompts. Since the prompts to the language model 150 are based on user inputs, the language model 150 is thus learning how to generate queries to retrieve API calls relevant for responding to user inputs.

The model training component 180 may initiate updating of the language model 150 after a certain amount of training data is stored in the training data storage 185. The process illustrated in FIG. 1 may be performed with respect to multiple different instances of the user input data 127 to determine multiple different instances of training data. In some embodiments, the process illustrated in FIG. 1 may be performed with respect to the user input data 127 when the user input data 127 is received by the system 100, during runtime operations or while other runtime operations (e.g., operations to respond to the user input) are being performed by the system component(s) 120. In some embodiments, the process illustrated in FIG. 1 may be performed during offline operations with respect to previously received (past) user input data 127.

In some embodiments, the training data, determined based on the metrics data 178, may be provided to the prompt generation component 140 to improve the language model 150 performance and may be fed to the prompt generation component 140 until performance of the language model 150 improves. For example, in a first iteration of processing the user input data 127, based on the (first/initial) metrics data 178, training data including the (first/initial) prompt 145 and the LM query 155 may be determined. In a second iteration of processing, the prompt generation component 140 may determine, based on the determined training data, a second prompt including the user input data 127 (e.g., the LM query 155 may be included in the second prompt as an exemplar, the second prompt may include same or similar information as the initial prompt 145, etc.). The language model 150 may process the second prompt and the system may determine second metrics data corresponding to the user input data 127, where the second metrics data may represent improvements in the language model's reasoning/processing based on a second iteration of processing the user input data. Based on the second metrics data, the system may determine further training data and/or may cause a third iteration of processing with respect to the user input data 127. For example, if the second metrics data satisfies a condition (e.g., fails to meet a performance threshold), then the third iteration may include generation of a further prompt, including the user input data 127, for the language model 150. Further iterations may be performed until the corresponding metrics data satisfies a condition (e.g., satisfies a performance threshold). Such iterations of processing (e.g., looped processing) may enable the language model 150 to improve its reasoning.

Figure 8:
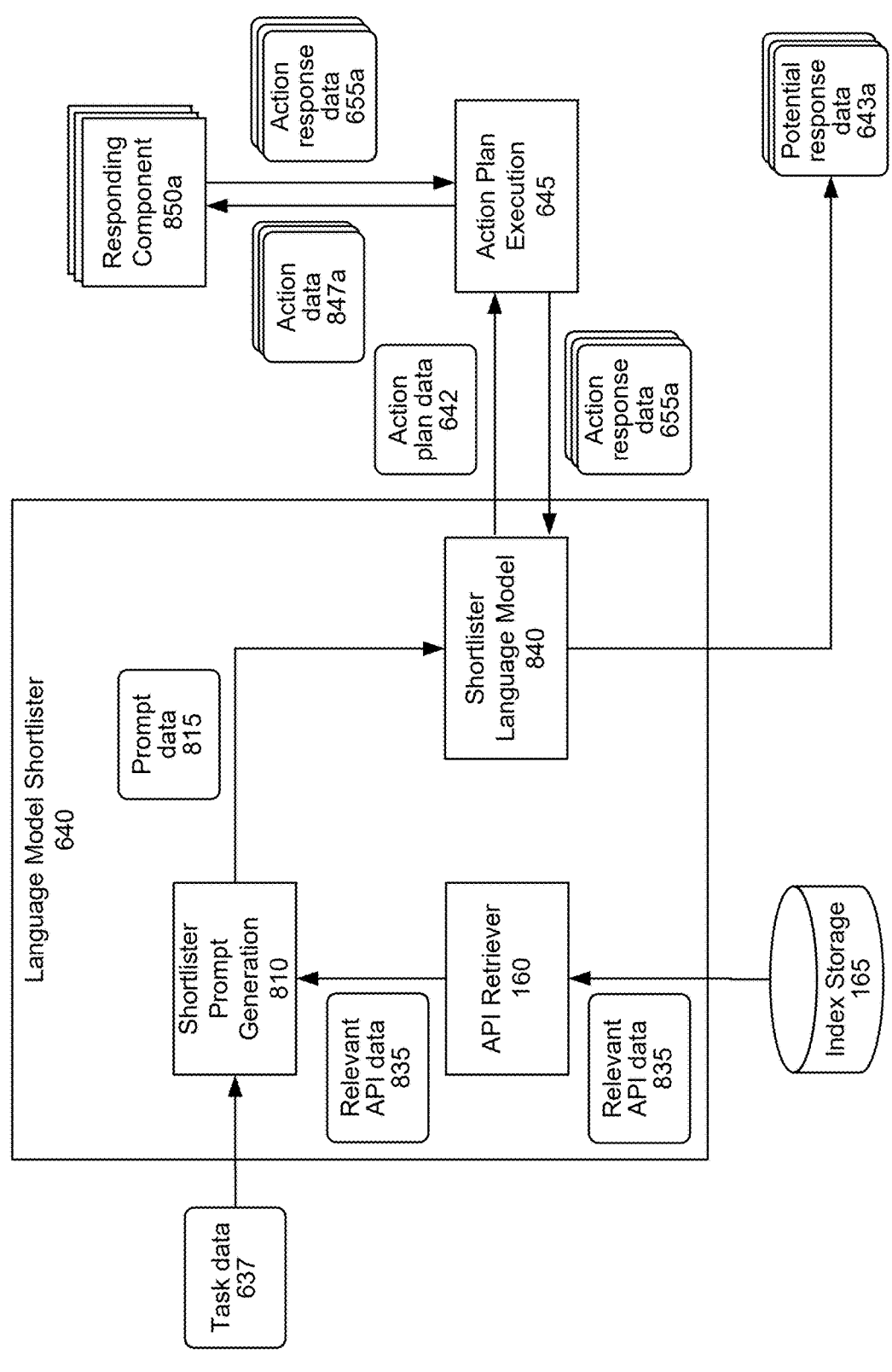
FIG. 8 is a conceptual diagram illustrating example components and processing of a language model shortlister component of the system, according to embodiments of the present disclosure.

In some embodiments, the API retriever component 160 may be part of a language model shortlister 640 shown in FIG. 8. In some embodiments, the language model 150 may also be included in the language model shortlister 640 and may be used to generate a query to the API retriever component 160 to determine relevant API data 835 shown in FIG. 8.

Figure 3:
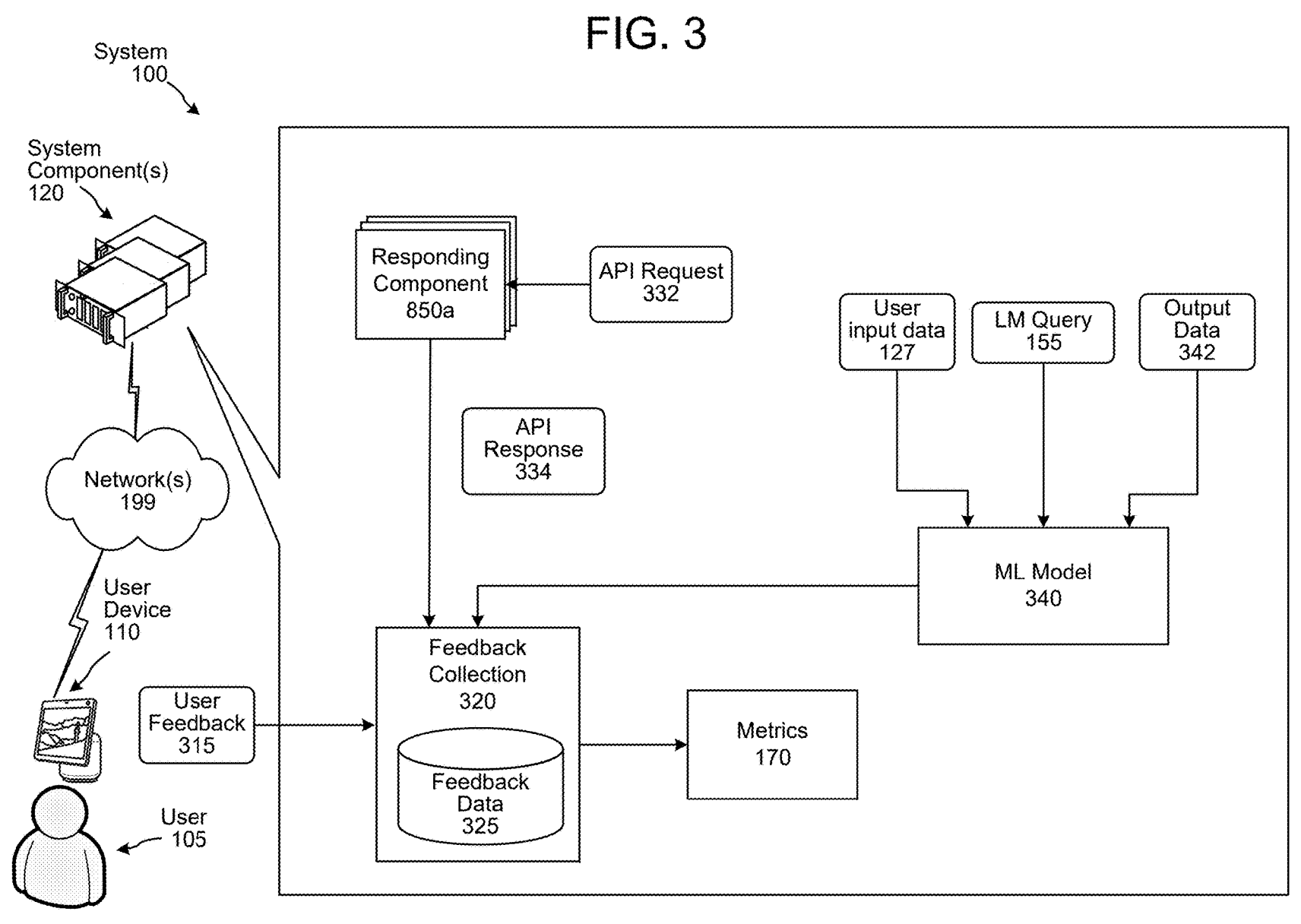

In some embodiments, the process of evaluating the language model 150 performance in generating queries for API retrieval (shown in FIG. 1) may be initiated based on feedback associated with the user input data 127 and/or a system output to the user input data 127. FIG. 3 is a conceptual diagram illustrating example components of the system 100 for determining feedback associated with user inputs and/or system outputs. In some embodiments, the system component(s) 120 may include a feedback collection component 320 configured to determine feedback from various sources as described herein. The feedback collection component 320 may include feedback data storage 325 or may be in communication with the feedback data storage 325.

The feedback data storage 325 may store feedback data associated with a user input or a group of user inputs that are semantically or lexically similar. The feedback data may be a numerical value (e.g., score) that may indicate, based on satisfying a condition (e.g., positive threshold value, negative threshold value, neutral threshold value, etc.), positive, negative or neutral feedback corresponding to the user input(s). The feedback data may be a label indicative of positive, negative or neutral feedback corresponding to the user input(s). In some embodiments, the feedback data may be a single value based on aggregation of feedback from various sources. In other embodiments, the feedback data may be multiple values, each corresponding to feedback from a particular source. In some embodiments, the feedback data storage 325 may indicate a number of instances in which feedback is received with respect to the user input(s) (e.g., feedback collected based on 100 instances, feedback collected based on 1000 instances, etc.).

In some embodiments, the feedback collection component 320 may initiate processing by the metrics component 170 (or another system component 120) based on the feedback data satisfying a condition. For example, if feedback associated with a particular user input(s) satisfies a negative feedback condition (e.g., a threshold negative feedback value, a threshold number of instances in which negative feedback is received, a threshold number of instances in which any feedback is received, etc.), then the feedback collection component 320 may initiate the evaluation described in relation to FIG. 1. In some embodiments, such initiation may be performed by sending data (e.g., a request, an indicator, etc.) to the metrics component 170. For example, the feedback collection component 320 may send the user input(s) and associated feedback data to the metrics component 170 and the metrics component 170 may retrieve a ground truth API call(s) based on the received user input.

In some embodiments, the system component(s) 120 may store system processing data corresponding to a user input including a prompt 145, a LM query 155, API results 168, etc. When data is received from the feedback collection component 320, the metrics component 170 may retrieve at least the API results 168 from the stored system processing data to determine metrics data 178 corresponding to the user input. In other embodiments, the prompt 145 may be retrieved from the stored system processing data and processed using the language model 150 to determine a current LM query 155, which in turn may be used to retrieve current API results 168; in such cases the LM query and API results may reflect any updates that may have taken place with respect to the language model 150 or the API retriever component 160.

The feedback collection component 320 may receive different types of feedback from different sources, such as user feedback 315 from the user 105, system response (e.g., API response 334 from a responding component 850, ML-based feedback from ML model 340, and others.

The system component(s) 120 may receive user feedback 315 from the user device 110 provided by the user 105. The user feedback 315 may be implicit or explicit user feedback with respect to a system output. The system output may be generated based on a response to an API call that was retrieved by the API retriever component 160 based on a query generated by the language model 150. Implicit user feedback may refer to feedback that is derived, by the system, from some action performed by a user. For example, the system may determine implicit user feedback based on a user making certain sounds (e.g., sighing, giggling, etc.), a user interrupting output of the system response (e.g., by providing another user input while the system output is being presented), a user requesting output of the system response be stopped/canceled, a user expressing a particular sentiment or emotion during output of the system response (e.g., sentiment detected from gestures and/or facial expressions, sentiment detected from voice), etc. Explicit user feedback may refer to feedback specifically provided by a user in response to a prompt for such feedback by the system or in response to the system presenting the system output. For example, after outputting the system response, the system may cause a device to output the synthesized speech (and/or display text, graphics, etc.) "did I answer your question," "did I respond correctly," display 'thumbs up' and 'thumbs down' icons, or present other similar outputs requesting feedback from the user. The user may respond to such an output by saying "yes" (or another similar affirmative response) or "no" (or another similar negative response), or by providing feedback in other input forms, such as via a touchscreen of the device, by performing a gesture (e.g., thumbs up, thumbs down, etc.) that is captured by a camera of the device, providing a facial expression (e.g., a smile, a frown, etc.) that may be captured by a camera of the device, selecting a button on the device, etc. As another example, after presentation of the system output, the user may provide a subsequent input responsive to the system output, such as "thank you", "that's not right", etc.

The system may determine whether an interaction was satisfactory or unsatisfactory based on explicit and/or implicit feedback corresponding to the system output. An interaction may be satisfactory when the user is satisfied with the system output to the user input/user input data 127 and may provide positive feedback or non-negative (neutral) feedback in response to the system output. An interaction may be unsatisfactory when the user is unsatisfied with the system output, may provide negative feedback in response to the system output (e.g., express some frustration). Examples of positive user feedback may be the user saying "thank you," the user smiling or nodding the user's head, the user showing a thumbs up gesture, the user providing another input to continue the interaction, etc. Examples of negative user feedback may be the user saying "that's not what I wanted," the user interrupting the output by saying "cancel" or "stop," the user frowning or shaking the user's head, the user showing a thumbs down gesture, the user rephrasing or repeating the user input, etc.

In addition to or instead of the user feedback 315, the feedback collection component 320 may receive system-based feedback corresponding to the user input data 127. In some embodiments, the system-based feedback may be in the form of an API response 334 from the responding component 850, where the API response 334 may be provided in response to an API request 332. The API request 332 may be sent to the responding component 850 and may correspond to an API call determined by the API retriever component 160 based on the LM query 155. In some examples, the API request 332 may correspond to the top-ranked API call in the API results 168. In some examples, the API request 332 may correspond to an API call that may be selected, from the API results 168, by a system component 120 (e.g., language model shortlister 640 shown in FIG. 6) to provide a response to the user input data 127.

The feedback collection component 320 may determine that the API response 334 corresponds to negative feedback when the API response 334 indicates an error. In some cases, the API request 332 to the responding component 850 may be improper, invalid, etc. and the responding component 850 may output the API response 334 representing an error. For example, the API request 332 may be an API call that is not supported by the responding component 850, may include arguments or argument values that are invalid for the API call, etc. As an example, the API response 334 may be "bad request", "invalid arguments", "404", "null", "offline", etc. In some cases, the responding component 850 may be inactive, offline, or otherwise unavailable to process, in which case, the API response 334 may be "offline" or other similar error.

The feedback collection component 320 may determine that the API response 334 corresponds to positive (or non-negative/neutral) feedback when the API response includes a non-error output. In cases where the API request 332 is valid, proper, etc., the responding component 850 may provide the API response 334 corresponding to the API request 332. For example, the API response 334 may be text, tokens, Boolean value, indicative of an action being completed, etc.

The feedback collection component 320 may determine system-based feedback using data received from one or more other system components 120.

In addition to or instead of the user feedback 315 or the system-based feedback, the feedback collection component 320 may receive ML-based feedback from the ML model 340. In some embodiments, the ML model 340 may be a machine learning model(s) trained to determine feedback with respect to processing of the user input data 127 by the system 100. In some embodiments, the ML model 340 may be trained to determine feedback with respect to the language model 150 generating the LM query 155 that results in a particular system output (e.g. output data 342).

In some embodiments, the ML model 340 may process the user input data 127, the LM query 155 and output data 342. The ML model 340 may receive and process other data as well. The output data 342 may represent the system output corresponding to the user input data 127. The system output may be generated based on an API call that was retrieved by the API retriever component 160 based on the LM query 155 generated by the language model 150. The output data 342 may be text data, tokens, audio data, image data, etc. representing the system output presented to the user 105.

In some embodiments, the ML model 340 may be configured to output a label/category indicator of positive feedback, negative feedback or neutral feedback. In some embodiments, the ML model 340 may be configured to output a likelihood (e.g., a score) that the user input data 127 corresponds to positive feedback, negative feedback or neutral feedback. The ML model 340 may be configured to determine whether the output data 342 in response to the user input data 127 resulted in a satisfactory or unsatisfactory interaction and may be configured to consider at least the LM query 155 in making the determination. In some embodiments, the ML model 340 may be configured to determine whether the LM query 155 is the cause of the satisfactory or unsatisfactory interaction.

The feedback collection component 320 may determine aggregated feedback data for the user input data 127 based on aggregating at least the user feedback, the system-based feedback and the ML-based feedback, if all are available. In some cases, fewer than all of the types of the feedback may be available for a particular interaction. The feedback collection component 320 may aggregate feedback for user inputs that are (semantically or lexically) similar and that are part of different interactions/dialogs. In this manner, the feedback collection component 320 may determine feedback for a user input based on multiple different interactions between multiple different users or user devices. The feedback collection component 320 may store the aggregated feedback data in the feedback data storage 325 as described herein.

In some embodiments, the metrics data determination may be initiated based on the feedback data associated with a user input. FIG. 4 is a flowchart illustrating an example process 400 for the foregoing. At a step 402, the system may determine feedback data corresponding to a user input, where the feedback data is user feedback, system-based feedback and/or ML model determined feedback. As described in relation to FIG. 3, the feedback collection component 320 may determine and store feedback, associated with a user input, that may be received from various sources.

At a decision block 404, the system may determine whether the stored feedback data, from the feedback data storage 325, satisfies a condition for model training. In some embodiments, the condition may correspond to a threshold value for negative feedback, a threshold value for positive feedback, a threshold number of instances (e.g., interactions) for which feedback is determined, and/or a threshold number of instances over a period of time. In example embodiments, the system may determine if the stored feedback satisfies the threshold number of instances (e.g., feedback has been collected for at least 100 interactions in the last month), then the condition for model training may be satisfied. In example embodiments, additionally or instead the system may determine if the stored feedback satisfies the threshold value for negative feedback (e.g., the system output is resulting in unsatisfactory interactions), then the condition for model training may be satisfied. In example embodiments, additionally or instead the system may determine if the stored feedback satisfies the threshold value for positive feedback (e.g., the system output is resulting in satisfactory interactions), then the condition for model training may be satisfied.

If the condition for model training is not satisfied, then the system may continue to determine (step 402) feedback data for the user input. If the condition for model training is satisfied, then at a step 406, the system may determine metrics data corresponding to the user input and a language model generated query. In some embodiments, the system may perform the process described in relation to FIG. 1 by generating the prompt 145 based on the user input data 127 (representing the user input for which feedback data satisfies the condition for model training), processing the prompt 145 using the language model 150 to determine the LM query 155, using the API retriever component 160 to determine the API results 168 corresponding to the LM query 155, and using the metrics component 170 to determine the metrics data 178 corresponding to the LM query 155. In other embodiments, the system may store system processing data corresponding to the user input, where the data may include the prompt 145, the LM query 155, and/or the API results 168 (all determined previously when processing the user input during runtime operations), and the metrics component 170 may use the stored system processing data to determine the metrics data 178 corresponding to the LM query 155. In yet other embodiments, the system may retrieve the prompt 145 from the stored system processing data, process the stored prompt 145 using the language model 150 to determine the LM query 155, determine the API results 168 corresponding to the LM query 155, and determine the metrics data 178 corresponding to the LM query 155; in such cases, the LM query and API results may reflect any updates that may have taken place with respect to the language model 150 or the API retriever component 160.

At a step 408, the system may determine training data based on the metrics data 178. The model training component 180 may determine training data including an association (e.g., a pair) of user input data 127 and LM query 155. In some embodiments, the model training component 180 may determine a positive training sample including the user input data 127 and the LM query 155 when the metrics data 178 indicates a high (or neutral) model performance of the language model 150. In some embodiments, the model training component 180 may determine a negative training sample including the user input data 127 and the LM query 155 when the metrics data 178 indicates a low model performance of the language model 150.

At a step 410, the system may train the language model 150 using the training data that may be stored in the training data storage 185. Training operations may include finetuning the language model 150 using positive training samples and/or negative training samples so that the language model 150 may learn how to generate a query to retrieve API calls corresponding to actions requested in a user input.

Techniques similar to the ones described herein may be used to evaluate generation of queries/inputs by the language model 150 for other components. FIG. 5 is a flowchart illustrating an example process 500 for evaluating language model generated queries. At a step 502, the system may determine a prompt for the language model 150, where the prompt requests generation of a query to a system component. The query can be an input to a system component, such as a responding component 850, where the query may be formatted for the particular system component, including arguments, values, parameters, etc. The prompt may include exemplars of queries for the particular responding component 850. The prompt may include the purpose for generating the query so that the language model 150 can generate an appropriate query. The prompt may include information, such as a user input, based on which the query is to be generated.

In one non-limiting example, the system may be used to evaluate language model generated queries for knowledge bases or other type of question-answering systems. The prompt, in such examples, may indicate a type of knowledge base (e.g., music knowledge base, movie knowledge base, news/current events knowledge base, etc.) being queried. An example prompt may be: {Generate a query for a music knowledge base to answer the following user question. User question: "Who sings [song name]?"}.

Figure 6:
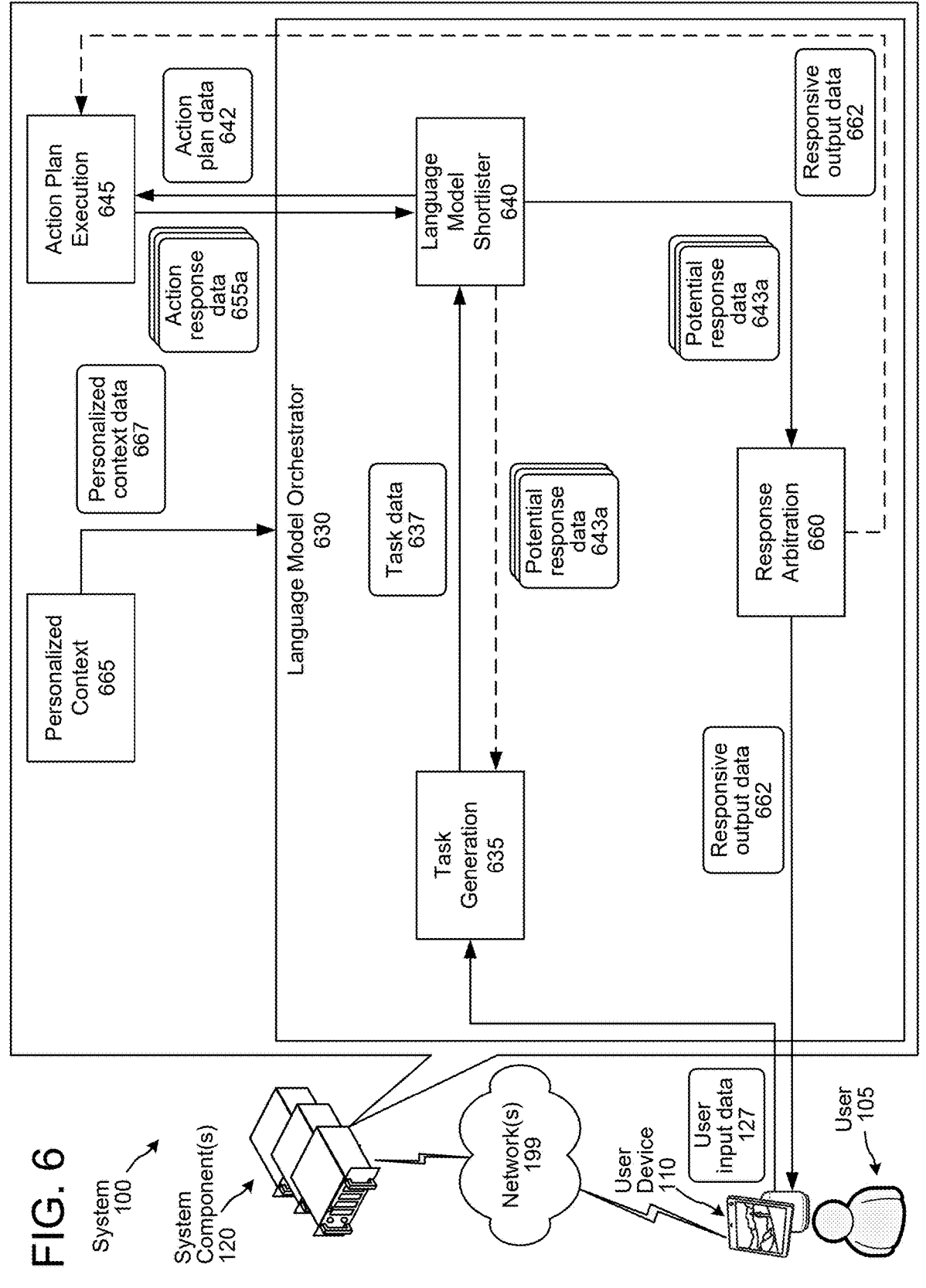
FIG. 6 is a conceptual diagram illustrating example components and processing of a system configured to use a language model(s) to determine a response to a user input, according to embodiments of the present disclosure.

In another non-limiting example, the system may be used to evaluate language model generated queries for context determination components (e.g., personalized context component 667 shown in FIG. 6). The system may send a request (query) to a context determination component to determine context relevant for processing user input data or other types of input data. The prompt, in such examples, may indicate a type of context to be generated, where types of context may include user context, device context, environment context, personalized context, and the like. The prompt may include the user input/input data for which context is to be determined. The prompt may include exemplars of inputs/queries for the context determination component. An example prompt may be: {Generate a query to determine relevant context for the following user input? User input: "Can you play some relaxing music?"}.

At a step 504, the system may process the prompt using a language model (e.g., the language model 150 or another language model) to generate the query. The language model may generate the query based on the directive included in the prompt. For example, for a knowledge base query, the query may be formatted for the particular knowledge base, may include parameters, etc. based on the user query, etc. In this case, an example query may be: Which artist or artists sing the song titled "[song name]. As another example, for a context determination component query, the query may be formatted for the particular component, may include parameters, etc. based on the user input, etc. In this case, an example query may be: {Provide user preferences for music at [current time]. Provide past interactions for the user involving music and genre: relaxing music.}

At a step 506, the system may receive, from the system component, a first response to the query. In some embodiments, the first response may be a list of potential/candidate responses or a ranked list of potential/candidate responses. The first response may be received from the system component for which the language model generated the query. The generated query (from step 504) may be sent to the system component for processing and the system component provide the first response based on the processing. For example, the first response from a knowledge base may be information (e.g., an answer) corresponding to the query (e.g., an artist name for the artist that sings the [song name], a list of potential artist names for the artist that sings the [song name], etc.). As another example, the first response from a context determination component may be context relevant to the query (e.g., user's preferred music genre, past user interactions at the requested time period, etc.).

At a step 510, the system may determine metrics data based on a correspondence between the first response and a second response. The second response may be a ground truth response determined from stored data including (ground truth, correct, etc.) responses to user inputs. The metrics data may be determined in a similar manner as described herein in relation to the metrics component 170. The metrics data may represent performance of the language model in generating a query, based on a user input, for the system component so that a response from the system component corresponds to a correct, desired or ground truth response for the user input. The metrics data may be based on the first response matching the second response, the second response appearing in the list of candidate responses, and/or a rank of the second response in the list of candidate responses. The metrics data may be determined in a similar manner as described in relation to FIG. 2.

At a step 512, based on the metrics data, the system may train the language model. Training data including the query generated by the language model and the prompt or user input may be determined. Based on the corresponding metrics data, the training data may be used as a positive sample or a negative sample. For example, if the metrics data indicates high model performance, then the training data may be a positive sample and if the metrics data indicates low model performance, then the training data may be a negative sample. The training data may represent sample queries for sample prompts/user inputs and the language model may learn how to generate queries (or inputs) for system components.

In some embodiments, the system may implement zero-shot prompting for the language model 150. The prompt may be a directive for a pretrained language model to generate description of tools (e.g., API calls) required to address a user's request. This method may be considered as zero-shot since there is no use of API information or task supervision therefore it can be directly applied to unseen use cases and API calls. Below is an example prompt for such a method:

{
Given a request by user (User), generate the description of an API call(s) that can be used to address the request. Try to decompose the request to a set of descriptions for API call(s) that can help handle the request. Use a new line to separate multiple descriptions. Each description should be less than 20 words. Return at most 5 descriptions (lines).

Do not provide any additional explanation or examples, return just a set of API call descriptions.
User: [user request]
}

In some embodiments, the system may implement supervised finetuning of the language model 150. Using a training dataset including user requests paired with relevant API calls, the language model 150 may be finetuned for a query generation task. The relevant API descriptions or API calls (which may be included in the ground truth storage 175) may be used as the generation target label. In example embodiments, training may be limited to one epoch with weight decay regularization and the loss may be computed for generated tokens resulting in improved convergence and overfitting reduction.

Supervised finetuning can alleviate issues with hallucination and output consistency. However, forcing the language model directly to regenerate descriptions for a specific training dataset may result in overfitting on seen set of examples and API calls. This may result in an unreliable behavior for API calls that are not seen during the training process. Training on a specific set of API calls, may teach the language model to try to match current set of API calls for any new/unseen user request, regardless of the availability of additional tools/API calls at the time of inference. API descriptions are generally provided by individual developers, may not follow any strict format/content protocol, and may contain extra or irrelevant information that can potentially bias the finetuned language model and mislead the retrieval process.

To address these issues, in some embodiments, the system may use an alignment training method for the language model. The alignment training method may teach the language model to generate queries that result in the best retrieval performance. Rather than directly forcing the model to generate a particular target sequence, a reward metric measured based on retrieval performance is used, and then high-reward generations are encouraged in an iterative alignment loop. The following is an overview of an example iterative alignment process.

Input: training user requests and corresponding relevant API calls (X,Y), pretrained language model weights ($\theta_0$), number of stochastic generations (m), reward metric e.g., MMRR/MAP (r_metric), minimum draft reward ($r_{min}$), top reward percentile threshold ($P_{top}$), number of top drafts to keep per sample ($n_{draft}$)
Output: the final trained model weights ($\theta_T$)
for each alignment iteration
for t in 1 . . . . T
generate queries for the training dataset, sample m times
Z1 . . . m←generate_queries (X, $\theta_{t-1}$, m)
compute rewards
Rt←compute_rewards (X, Z1 . . . m, Y, r_metric)
filter on min reward and top-percentile
Xt, Zt←filter_samples (X, Z1 . . . m, Rt, $r_{min}$, $p_{top}$, $n_{draft}$)
supervised finetuning on filtered generations
θt←supervised_finetuning (Xt, Zt, θt−1)
Starting with a pre-trained language model, then for T alignment iterations, using the language model from the most recent iteration to generate m set of queries (Z1 . . . m) for each training sample and relevant API call pair (X, Y). To generate such queries given the most recent iteration of the model θt−1, stochastic generation is used to promote diversity among the generated drafts. Then, retrieval of items is simulated in the training set using the generated queries in Z1 . . . m, and MMRR (or another metric) is computed for all samples. A filter may be applied on the reward values to only keep the top n drafts with highest rewards among the set of m for each sample, and subsequently remove any remaining sample that has a reward value less than I'min or falls outside the prop percentile of the population. Supervised finetuning using the filtered samples may be performed. This process may be repeated T times to iteratively improve the model's capability to generate better queries.

FIG. 6 illustrates further example components included in the system 100 configured to determine an action responsive to a user input. As shown in FIG. 6, the system may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as a language model orchestrator component 630, a personalized context component 665, and an action plan execution component 645. The language model orchestrator component 630 may include a task generation component 635, a language model shortlister component 640, and a response arbitration component 660.

In some embodiments, the language model orchestrator component 630 may generate prompt data representing a prompt for input to the language models. As shown in FIG. 6, the system component(s) 120 receive user input data 127, which may be provided to the language model orchestrator component 630. In some instances, the user input data 127 may correspond to various data types, such as text (e.g., a text or tokenized representation of a user input), audio, image, video, etc. For example, the user input data may include input text (or tokenized) data when the user input is a typed natural language user input. For further example, prior to the language model orchestrator component 630 receiving the user input data 127, another component (e.g., an automatic speech recognition (ASR) component 1050) of the system 100 may receive audio data representing the user input. The ASR component 1050 may perform ASR processing on the audio data to determine ASR data corresponding to the user input, which may correspond to a transcript of the user input. As described below, with respect to FIG. 10, the ASR component 1050 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 1050 level of confidence that the corresponding hypothesis represents what the user said. The ASR component 1050 may also determine token scores corresponding to each token/word of the ASR hypothesis, where the token score indicates the ASR component's 1050 level of confidence that the respective token/word was spoken by the user. The token scores may be identified as an entity score when the corresponding token relates to an entity. In some instances, the user input data 127 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 127).

In some embodiments, the language model orchestrator component 630 may receive input data, which may be processed in a similar manner as the user input data 127 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a user device 110 (e.g., a smartphone, a smart speaker, etc.) to present an alert to the user. The language model orchestrator component 630 may process the input data to generate tasks that may cause the foregoing example actions to be performed.

The user input data 127 may be received at the task generation component 635 of the language model orchestrator component 630, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100), as described in detail herein. For example, for a user input of "What is the weather for today," the task generation component 635 may generate a list of tasks of "(1) determine current outside temperature from thermostat; and (2) determine weather forecast for today" and select the task of "determine weather forecast for today" to be completed first. In instances where the task generation component 635 generates more than one task to be completed in order to perform the action responsive to the user input, the task generation component 635 may further maintain and prioritize the list of tasks as the processing of the system 100 with respect to the user input is performed. In other words, as the system 100 processes to complete the list of tasks, the task generation component 635 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed.

In some embodiments, the task generation component 635 may process as described above using one or more language models (e.g., LLMs). For example, the task generation component 635 may include a language model (e.g., and LLM) configured to generate the list of tasks that are to be completed in order to perform the action responsive to the user input and select a task of the list of tasks that is to be completed first. In some such embodiments, the user input data 127 may be received at a prompt generation component configured to generate a prompt for input to the language model. The prompt may include the user input data 127 and various other information usable by the language model to generate the list of tasks that are to be completed in order to perform the action responsive to the user input (e.g., an indication of one or more remaining tasks to be completed with respect to the user input, an indication of one or more potential responses associated with a completed task(s), and/or various contextual signals associated with the user input. The prompt may be a directive for the language model to determine the list of tasks given the information included in the prompt. The language model may process the prompt to generate the list of tasks.

The task generation component 635 may generate and send task data 637 representing the selected task to be completed and various other information needed to perform further processing with respect to the task (e.g., the user input data 127, an indication of the selected task, potential responses associated with previous tasks, the remaining task(s), and context data associated with the user input data 127, as described in detail herein) to the language model shortlister component 640.

The language model shortlister component 640 may be configured to determine one or more components (e.g., a responding component, such as APIs, skill component(s), language model (e.g., LLM) agent component(s), a TTS component, etc. as discussed herein) configured to perform an action related to the user input or the current task. The language model shortlister component 640 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the language model shortlister component 640 may generate requests of "use Weather Application A to determine weather forecast for today" and "use Weather Application B to determine weather forecast for today," or the like.

In some embodiments, the language model shortlister component 640 may process as described above using one or more language models (e.g., LLMs). For example, the language model shortlister component 640 may include a language model (e.g., an LLM) configured to determine one or more components configured to perform an action related to the user input or the current task and cause the execution of a request(s) for the one or more components to provide a potential response(s) to the user input or current task. In some such embodiments, the task data 637 may be received at a prompt generation component configured to generate a prompt for input to the language model. The prompt may include the task data 637 and an indication of one or more components (e.g., APIs) determined to be relevant to the current task/the user input. The prompt may be a directive for the language model to generate a request for a component(s) (of the components determined to be relevant) to provide a potential response(s) to the user input or current task given the information included in the prompt. The language model may process the prompt to generate the request(s).

Such requests may be represented in the action plan data 642 sent to the action plan execution component 645. The action plan execution component 645 may identify the request(s) in the action plan data 642, generate executable API calls corresponding to the request(s), and cause the corresponding components (e.g., the responding component(s)) to generate action response data 658a-n representing the requested potential response(s), where individual action response data 658a may be provided by/correspond to a particular responding component. In some embodiments, the action response data 658a-n may include an identifier (e.g., a component name, an alphanumerical value associated with the component, etc.) for the component providing the data. The language model shortlister component 640 receives and processes the action response data 658a-n and generates potential response data 643a-n representing the potential response(s) (e.g., relevant potential responses, selected potential responses, ranked potential responses, etc.) for further processing (e.g., as described in detail herein). If the language model shortlister component 640 determines that there are no remaining tasks to generate potential responses for, the language model shortlister component 640 may send the potential response data 643a-n to the response arbitration component 660.

The potential response data 643a-n, in some embodiments, may be determined based on receiving potential responses from various different components that may be relevant in responding to the user input data 127. For example, the potential response data 643a-n may include a first potential response from a first component configured to perform a first task determined by the task generation component 635, a second potential response from a second component configured to perform a second task determined by the task generation component 635, etc. The potential response data 643a-n can include more than one potential response relating to an individual task. In some embodiments, the potential response data 643a-n may be natural language data.

The response arbitration component 660 processes the potential response data 643a-n to determine whether potential responses generated for the one or more tasks are responsive to the user input. The response arbitration component 660 processes the potential response data 643a-n (representing at least the generated potential responses) and selects one or more of the potential responses that are determined to be responsive to the user input and/or determines that none of the actions are responsive to the user input. For example, the response arbitration component 660 may process the potential response data 643a-n to determine if one or more of the potential responses performable by the API(s) (e.g., the potential responses and/or potential actions) are responsive to the current task. In some embodiments, the response arbitration component 660 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 660 may generate a natural language summary of "The weather for today is expected to be mostly sunny with a high of 75 and a low of 68 and a slight chance of rain in the evening," or the like.

In some embodiments, the response arbitration component 660 may process as described above using one or more language models (e.g., LLMs). For example, the response arbitration component 660 may include a language model (e.g., an LLM) configured to generate a response to the user input using one or more of the potential responses that are determined to be responsive to the user input and/or determines that none of the potential responses are responsive to the user input. In some such embodiments, the user input data 127 and the potential responses (and in some embodiments, the contextual signals associated with the user input) may be received at a prompt generation component configured to generate a prompt for input to the language model including the information. The prompt may be a directive for the language model to, given the information included in the prompt, generate a response to the user input using one or more of the potential responses that are determined to be responsive to the user input and/or indicate that none of the potential responses are responsive to the user input. The language model may process the prompt to generate the response to the user input or the indication that none of the potential response are responsive to the user input. In instances where the language model generates the indication that none of the potential responses are responsive to the user input, the indication may further include a request for information to be output to the user (and/or provided to another component of the system configured to determine the information).

The output generated by the response arbitration component 660 may be provided to one or more components of the system 100 (e.g., the TTS component 1056, a visual output component, etc. via, for example, the action plan execution component 645) and/or sent to the device 110 for output to the user.

Figure 7:
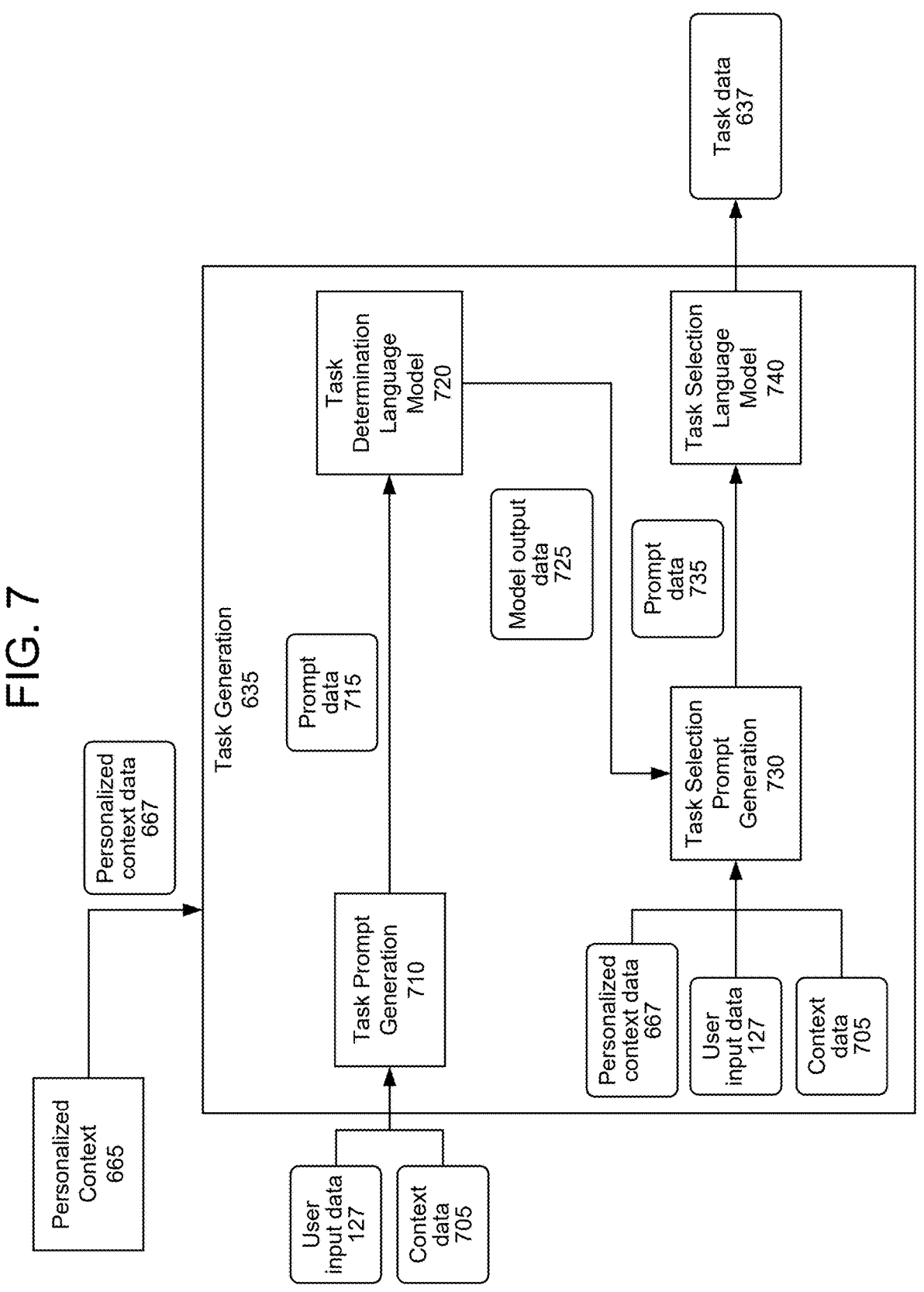
FIG. 7 is a conceptual diagram illustrating example components and processing of a task generation component of the system, according to embodiments of the present disclosure.

FIG. 7 illustrates example processing of the task generation component 635. As shown in FIG. 7, the task generation component 635 may include a task prompt generation component 710, a task determination language model 720, a task selection prompt generation component 730, and a task selection language model 740.

As further shown in FIG. 7, the user input data 127 is received at the task prompt generation component 710, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 100).

The task prompt generation component 710 processes the user input data 127 to generate prompt data 715 representing a prompt for input to the task determination language model 720. In some embodiments, the task prompt generation component 710 may further receive an indication of one or more remaining tasks to be completed with respect to the user input data 127. A task to be completed may correspond to a task for which the system 100 has yet to generate potential responses for (e.g., for which the responding component 850*a-n*, such as the API provider component, the language model agent component, the skill component 1054, and/or the TTS component 1056 have yet to generate action response data for). Similarly, a completed task may correspond to a task for which the system 100 has generated potential responses for (e.g., for which the responding component 850*a-n*, such as the API provider component, the language model agent component, the skill component 1054, and/or the TTS component 1056 have generated action response data). For example, if the current iteration of processing with respect to the user input data 127 is a subsequent iteration of processing (e.g., the system previously determined that more than one task is to be completed in order to perform an action responsive to the user input data 127 and has previously generated potential responses for at least a first task of the more than one tasks), then the task prompt generation component 710 may further receive an indication of the remaining tasks to be completed. In such embodiments, the task prompt generation component 710 may further receive an indication of the task(s) to complete processing for and/or the potential response(s) of the processing. The task prompt generation component 710 may further receive the context data 705 representing various contextual signals associated with the user input data 127, such as weather information, time of day, device information associated with the device that sent the user input data 127 (e.g., device ID, device states, historical device interaction data, etc.). Such prompt data 715 may be generated based on combining the user input data 127 and the context data 705 (and, in some embodiments, the indication of the remaining task(s), completed task(s), and/or the potential responses). In some embodiments, the prompt data 715 may be generated further based on the personalized context data 667.

The task prompt generation component 710 may receive the personalized context data 667 from the personalized context component 665. As discussed herein above, the personalized context component 665 may be configured to determine and return contextual information associated with a user input to the one or more components of the system 100, such as the task prompt generation component 710, which the task prompt generation component 710 may combine with the user input data 127 to generate the prompt data 715.

As discussed herein above, the personalized context component 665 may be caused to generate and return the personalized context data 667 based on the system 100 determining that additional information is needed in order to generate potential responses for a task associated with a user input. For example, one or more of the components of the system 100 (e.g., the task determination language model 720, the task selection language model 740, the shortlister language model 840, and/or the response arbitration component 660) may determine that an ambiguity exists in the user input (or the data determined/generated as a result of processing with respect to the user input). In such examples, the personalized context component 665 may receive the user input (e.g., the user input data 127), other data associated with the current task (e.g., one or more portions of the task data 637), and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 665 may process as described herein above to generate the personalized context data 667 (e.g., "The user prefers [Music Streaming Service 1].")

In some embodiments, task prompt generation component 710 (or another component of the system 100) may process the personalized context data 667, the user input data 127, and/or the potential responses associated with the user input data 127 to generate a natural language representation of the user input (represented by the user input data 127) that is updated to include the contextual information of the personalized context data 667 (e.g., a contextual rewrite of the user input). Thereafter, the task prompt generation component 710 may process to generate the prompt data 715 using the updated user input data.

In some embodiments, the prompt data 715 may be a directive for the task determination language model 720 to determine one or more tasks (e.g., steps/actions) that are to be completed in order to perform an action responsive to the user input given the other information (e.g., the context data 705, the personalized context data 667, the indication of the remaining task(s), the indication of the completed task(s), and/or the corresponding potential responses) included in the prompt data 715.

The task determination language model 720 processes the prompt data 715 to generate model output data 725 representing one or more predicted tasks to be completed in order to perform the action responsive to the user input. For example, based on processing the first example prompt data provided above, the task determination language model 720 may output model output data 725a: {"turn on all of the lights except the garage light,"} or the like. For further example, as discussed above, based on processing prompt data corresponding to the user input "please order some pizza for dinner" the task determination language model 720 may output model output data 725b: {"identify user pizza preference;" "find application that enables ordering of pizza," or the like. After the first task of "identify user pizza preference" is complete, and based on processing the second example prompt data provided above, the task determination language model 720 may further output model output data 725c: {"find an application to order pizza" "find API to order [Pizza Company Name 1] pizza,"} or the like. In some embodiments, the threshold for determining the one or more tasks may be such that the task determination language model 720 is encouraged to generate multiple predicted tasks for a given user input, where the system 100 may parse and filter the list of tasks during downstream processing (e.g., during the processing of the task selection language model 740). For example, based on processing the first example prompt data provided above, the task determination language model 720 may output model output data 725d: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 725 is sent to the task selection prompt generation component 730, which processes the model output data 725 to generate prompt data 735 representing a prompt for input to the task selection language model 740. In some embodiments, such prompt data 735 may be generated based on combining the user input data 127, the context data 705, the personalized context data 667, the prompt data 715, and/or the model output data 725. In some embodiments, the task generation component 635 may include another component that parses the model output data 725 to determine the one or more tasks and may send a representation of the one or more tasks to the task selection prompt generation component 730.

In some embodiments, the prompt data 735 may be a directive for the task selection language model 740 to select a task of the one or more tasks that is to be completed first (e.g., completed during the current iteration of processing) given the information (e.g., user input data 127, the context data 705, the personalized context data 667, and the one or more tasks) included in the prompt data 735. In some embodiments, the prompt data 735 may further include a directive for the task selection language model 740 to determine a priority of the one or more tasks (e.g., an ordered list representing the order in which the one or more tasks are to be completed).

The task selection language model 740 processes the prompt data 735 to generate model output data representing the task to be completed first and/or a prioritization of the one or more tasks. For example, based on processing the first example prompt data provided above, the task selection language model 740 may output model output data: {"1. Turn on all of the lights except the garage light,"} or the like. For further example, based on processing the second example prompt data provided above, the task selection language model 740 may output model output data: {"1. Find an API that sells [Pizza Company Name 1] pizza,"} or the like. In some embodiments, during processing of the task selection language model 740 to select and/or prioritize the one or more tasks, the task selection language model 740 may update the task list to remove any redundant and/or conflicting tasks. For example, for the second example prompt data, the task selection language model 740 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 740 may remove the task of "find an application that sells pizza" from the remaining task list. Thereafter, the task generation component 635 (or another component of the task generation component 635) may process the model output data of the task selection language model 740 to determine task data 637 representing the user input data 127, the personalized context data 667, and/or the task selected by the task selection language model 740 to be completed first. In some embodiments, the task data 637 may include the remaining one or more tasks and/or may indicate the prioritization of the one or more tasks, as determined by the task selection language model 740. The task data 637 may be sent to the language model shortlister component 640, which is described in detail herein below with respect to FIG. 8.

FIG. 8 illustrates example processing of the language model shortlister component 640. As shown in FIG. 8, the language model shortlister component 640 may include an index storage 165, an API retriever component 160, a shortlister prompt generation component 810, and a shortlister language model 840.

The language model shortlister component 640 is configured to determine one or more components, for example, responding components 850a-n, configured to perform an action related to the user input or the current task. Responding components 850 may include APIs, skill component(s) 1054, language model agent component(s), TTS component 1056, etc. In some embodiments, the responding components 850 may be plugins that can be used with a language model described herein (e.g., the language model 150, the shortlister language model 840, the task selection language model 740, etc.), where the plugin may add functionality and features to the language model capabilities.

In some embodiments, the language model shortlister component 640 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 8, the task data 637 is received at the shortlister prompt generation component 810. The shortlister prompt generation component 810 processes the task data 637 to generate prompt data 815 representing a prompt for input to the shortlister language model 840. In some embodiments, such prompt data 815 may be generated based on combining the task data 637 (e.g., the user input data 127, the context data 705, the selected task, remaining tasks, potential responses associated with one or more previous tasks, etc.) and relevant API data 835 representing one or more APIs associated with the user input data 127 and/or the current task.

The relevant API data 835 may be generated by the API retriever component 160, which may be configured to retrieve one or more (e.g., top-k) relevant APIs associated with the user input data 127 or the current task. In some embodiments, the APIs may correspond to various components. For example, the components may correspond to rule-based components, ML-based components, language model-based components, or the like, such as the personalized context component 665, the orchestrator component 1030, the responding component 850a-n, etc.) In some embodiments, the APIs may correspond to the components.

The API retriever component 160 may use retrieval-based approaches to retrieve the one or more relevant APIs from the index storage 165, which may store various information associated with multiple APIs (and/or components) such as component descriptions, API arguments (e.g., parameter inputs/outputs), identifiers for components (e.g., such as personalized context component 665, the responding component 850a-n, etc.) that provides the API, etc. For example, the API retriever component 160 may compare one or more APIs (and/or components) included in the index storage 165 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retriever component 160 (or another component of the API retriever component 160) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 835. In some embodiments, the API retriever component 160 may determine the relevant API data 835 further using contextual information, including the personalized context data 667, an accuracy/defect rate value associated with the APIs (and/or components), and/or a historical latency value associated with the APIs (and/or components) (e.g., which may be included in the description of the API). In some embodiments, the index storage 165 may be included in the API retriever component 160. Similar processing may be performed to determine one or more components that are semantically similar to the user input or the current task, which may be included in the relevant API data 835. The API retrieval may send the relevant API data 835 to the shortlister prompt generation component 810.

In some embodiments, the prompt data 815 may be a directive for the shortlister language model 840 to determine one or more APIs (and/or components) that are to process with respect to the user input or the current task (e.g., determine one or more API calls to cause the APIs (and/or components) to process) given the information (e.g., the user input data 127, the personalized context data 667, the current task, and the relevant API data 835).

The shortlister language model 840 processes the prompt data 815 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 840 may generate API calls for a subset of the APIs represented in the prompt data 815. For example, based on processing the first example prompt data provided above, the shortlister language model 840 may output model output data: {"Use Let's chat API to turn on all of the lights except the garage light, Use Smart Home skill to turn on all of the lights except the garage light"}, {"Lets_chat.query ("turn on all of the lights except the garage light"), Smart_Home.turn_on_device ("[device names]"),} or the like. For further example, based on processing the second example prompt data provided above, the shortlister language model 840 may output model output data: {"Use [Food Ordering Application 1] to order pizza, Use [Food Ordering Application 2] to order pizza"}, {[Food Ordering Application 1].order ("Brooklyn style pizza"), [Food Ordering Application 2].order ("Brooklyn style pizza"),} or the like The shortlister language model 840 may generate the one or more APIs calls (including the required input parameters) by applying in-context learning for cold-starting API calls (e.g., one-shot/few-shot learning). For example, in embodiments where the relevant API data 835 includes the component descriptions, the shortlister language model 840 may use the one or more exemplars included in the component descriptions (included in the prompt data 815) to determine the one or more input parameters for the API call. In some embodiments, the shortlister language model 840 may be finetuned on such exemplars (e.g., during offline or runtime processing), such that the shortlister language model 840 is capable of determining the one or more input parameters for the given API call.

During processing of the shortlister language model 840 and after generating the one or more requests, the shortlister language model 840 may cause the one or more requests to be executed. For example, as shown in FIG. 8, the shortlister language model 840 may send action plan data 642 representing the one or more requests to the action plan execution component 645, which causes execution of the one or more requests included in the action plan data 642. For example, the action plan execution component 645 may process the action plan data 642 to generate action data 847a-n. Action data 847*a* may represent, for example, a directive (e.g., an executable API call determined from/generated based on the action plan data 642) for a particular API to process with respect to the user input and/or the current task. In embodiments where the action plan data 642 includes requests corresponding to incomplete API calls, API call formats, indications of actions to be performed by one or more components, the action plan execution component 645 may be configured to generate executable API calls corresponding to the action plan data 642. In some embodiments, the action plan execution component 645 may generate the action data 847*a-n* to represent a directive to provide the responses including the potential response(s)/potential action(s) with respect to the user input and/or the current task.

In some embodiments, the shortlister language model 840 may send model output data including the one or more requests to another component of the language model orchestrator component 630, which may be configured to parse the model output data to identify the one or more requests. Thereafter, the component may generate the action plan data 642 representing the one or more requests and send the action plan data 642 to the action plan execution component 645.

The action plan execution component 645 may send the action data 847*a-n* to the responding component 850*a-n*, such as the API provider component, the language model agent component, the skill component 1054, and/or the TTS component 1056. The API provider component may include one or more components (e.g., rule-based components, ML-based components, language model-based components, or the like) that may be caused to process using the action data 847*a-n* (e.g., using the API calls generated by the language model shortlister component 640).

The TTS component 1056 may be configured to process textual or tokenized input to generate audio data representing synthesized speech corresponding to the textual or tokenized input spoken by a synthetic voice. The processing of the TTS component 1056 is discussed in detail below with respect to FIG. 10.

The skill component 1054 may be software running on the system component(s) 120 that is akin to a software application. That is, a skill component 1054 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 1054. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 1054 may operate in conjunction between the system component(s) 120 and other devices, such as the user device 110, in order to complete certain functions. A skill component 1054 may include hardware, software, firmware, or the like that may be dedicated to a particular skill component 1054 or shared among different skill components 1054.

The language model agent component may correspond to one or more language mode (e.g., LLM) agents. A language model agent component may correspond to a custom instantiation of a language model (e.g., an LLM (and other components)) that is configured to handle user inputs relating to a particular domain/functionality. In some embodiments, the language model agent component may be configured to handle specific use cases via particular prompt generation, fine-tuning of the language model, etc. For example, the language model agent component may be configured to handle user inputs/tasks related to information query, the language model agent component may be configured handle user inputs/tasks related to shopping, the language model agent component may be configured to handle user inputs/tasks related to ordering food from various restaurants, the language model agent component may be configured to handle user inputs/tasks related to ordering food from a particular restaurant (e.g., a particular pizza restaurant), the language model agent component may be configured to handle user inputs/tasks related to booking a hotel, the language model agent component may be configured to handle user inputs/tasks related to booking a flight, etc.

The API provider component may include various components that may be caused to execute using the action data 847*a-n*. For example, the API provider component may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 847*a-n* may include an indication(s) (e.g., slots) of one or more entities included in the user input, as determined by one or more of the language models 720, 740, 840, in which case the ER component may process to link the one or more entities to the specific, referenced, entity known to the system 100.

In other embodiments, the ER component may be configured to process the action data 847*a-n* to determine one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component may include a search component, which may be configured to query a storage (e.g., a database, repository, knowledge base, etc.) for information usable for generating a response to a user input. For example, if the action data 847a-n represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component may include the device controller component discussed herein above, which may be further configured to cause a device to perform an action corresponding to the action data 847a-n.

In some embodiments, the API provider component may include a domain service component, which may be configured for interacting with one or more services defined by particular users, such as developers, specialists, or the like (e.g., to receive information, such as responses or annotations, to cause an action).

One or more of the responding components 850a-n may send action response data 658a-n representing one or more potential responses generated by the one or more APIs corresponding to the action data 847a-n (e.g., the potential response(s) and/or potential action(s)) to the action plan execution component 645. For example, in response to an API call to the skill component 1054 associated with a user input for turning on a light, the action response data 658a may correspond to a potential action of "turn on the light," "turn_on_device ("light", [device ID])", or the like. For further example, in response to an API call to the skill component 1054 associated with a user input for ordering a pizza from a particular restaurant, the action response data 658b may correspond to a potential action of "order medium pizza from [restaurant name]", "order_pizza ("medium", "pizza", "[restaurant name]")", or the like. The action plan execution component 645 may send the action response data 658a-n to the shortlister language model 840.

In some embodiments, the action plan execution component 645 may send the action response data 658a-n to the shortlister prompt generation component 810, which may generate further prompt data including the action response data 658a-n and be sent to the shortlister language model 840. For example, the further prompt data may be generated based on combining the prompt data 815 and the action response data 658a-n.

In some embodiments, the shortlister language model 840 may process the action response data 658a-n (or the further prompt data including action response data 658a-n) to generate a natural language summary of the action response data (e.g., the potential response data 643a-n). In some embodiments, the potential response data 643a-n may include an association between action response data 658a (or a summarized representation of the action response data 658a) and an indication of the API/component that generated the action response data 658a (e.g., a component identifier, component description, etc.). In some embodiments, the shortlister language model 840 may be configured to filter and/or rank the action response data 658a-n based on how relevant the action response data 658a-n is to the current task. In some embodiments, the shortlister language model 840 may be configured to filter and/or rank the action response data 658a-n based on a confidence level of the component that provided the action response data, where the confidence level may indicate a likelihood of the component being able to respond (e.g., within a period of time), the component being able to perform a potential action that corresponds to the current task, etc. In some embodiments, the action response data 658a-n may indicate whether or not the corresponding component is able to respond (e.g., the action response data 658a may include a Boolean value such as "yes" or "no" or other similar indications). In some embodiments, the shortlister language model 840 may filter and/or rank the action response data 658a-n based on information included in the prompt data 815 (e.g., the user input data 127, the relevant API data 835, the context data 705 the personalized context data 667, the prompt data 715, etc.). For example, the potential response data 643a-n may include a subset of the action response data 658a-n (or the summarized representations of the action response data 658a-n) and may further include a representation of a confidence associated with the action response data 658a (or a summarized representation of the action response data 658a). As such, the potential response data 643a-n may further include data representing a confidence of how relevant the action response data 658a is to the current task. In some embodiments, the shortlister language model 840 may consider a rating associated with the component that provided the action response data 658a, where the rating may be a user satisfaction rating provided by multiple different users of the system 100, a user satisfaction rating provided by the user 105 associated with the user input data 127, a system generated rating based on the number of past tasks handled by the component, a accuracy rating based on the number of past tasks the component had handled correctly/ provided a desired response for, etc.

The language model shortlister component 640 may send the potential response data 643a-n for further processing. In instances where the task generation component 635 determined that more than one task is to be completed, the language model shortlister component 640 may send the potential response data 643a-n to the task generation component 635, which may process as described herein above to maintain and prioritize the task list based on the potential response data 643a-n and select a new task to be completed. In instances where the task generation component 635 determined that only one task is to be completed, or in instances where the language model shortlister component 640 determines that there are no remaining tasks to be completed, the language model shortlister component 640 may send the potential response data 643a-n, and the potential responses associated with previously completed tasks (e.g., previous action response data) to the response arbitration component 660 to process as discussed herein above. The language model shortlister component 640 may further send the user input data 127, the context data 705, the personalized context data 667, etc., to the task generation component 635 and/or the response arbitration component 660.

In some embodiments, the language model orchestrator component 630 may further include a memory storage (not illustrated) which may store various information associated with the processing performed (e.g., user input data 127, the prompt data 715, the context data 705, the personalized context data 667, the model output data 725, prompt data 735, the task data 637, the relevant API data 835, the prompt data 815, the action plan data 642, the action response data 658a-n, the potential response data 643a-n, etc.) during one or more previous iterations of processing by the language model orchestrator component 630 for the user input data 127. As such, after the language model shortlister component 640 generates the potential response data 643a-n, the language model orchestrator component 630 may send the abovementioned data to the memory storage. In some embodiments, the above-mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 710 may receive one or more portions of the data included in the memory storage (which were generated during one or more previous iterations of processing performed with respect to the user input data 127) and include the one or more portions of data in the prompt data 715.

As discussed herein above, the shortlister language model 840 may be configured to determine whether additional information is needed in order to complete the current task (e.g., if an ambiguity exists in the user input data 127 or the current task, if the current task is to resolve an identified ambiguity, if an API argument is missing from the user input or other available data, etc.), in which case the shortlister language model 840 may send data representing a request for such additional information to the response arbitration component 660. In some embodiments, the action plan data 642 may represent the request for additional information, and the action plan execution component 645 may be configured to send corresponding action data 847a-n to the personalized context component 665. For example, for the example provided herein above with respect to ordering pizza, the shortlister language model 840 may determine that in order to resolve an ambiguity with respect to the user input data 127 or current task (e.g., based on the current task being to resolve the ambiguity or a determination that the current task cannot be completed due to the ambiguity), the system 100 must "identify user pizza preference," or the like. The system 100 may send a request to the personalized context component 665 to "identify user pizza preference" and the personalized context component 665 may process as described herein above to return personalized context data resolving the ambiguity (e.g., the user's pizza preference may be determined to be a cheese pizza or a pepperoni pizza).

Figure 9:
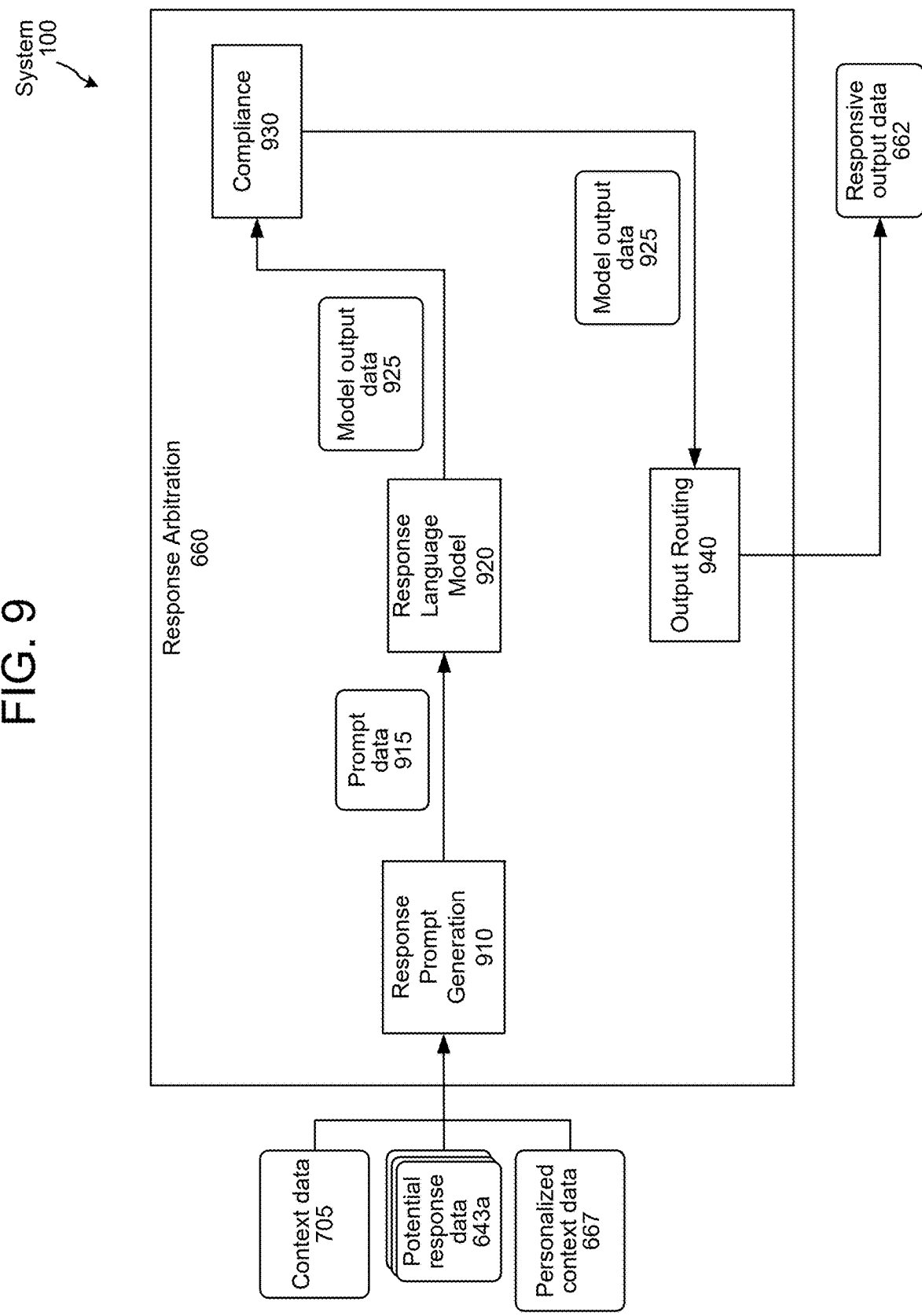
FIG. 9 is a conceptual diagram illustrating example components and processing of a response arbitration component of the system, according to embodiments of the present disclosure.

FIG. 9 illustrates example components and processing of the response arbitration component 660. As shown in FIG. 9, the response arbitration component 660 may include a response prompt generation component 910, a response language model 920, a compliance component 930, and an output routing component 940. As discussed herein above, the response arbitration component 660 processes the potential response data 643a-n (representing the potential responses generated by the one or more components determined to be associated with the user input) to determine whether one or more of the potential responses generated by the system 100 are responsive to the user input. The response arbitration component 660 may then generate the natural language response to the user input.

As shown in FIG. 9, the response arbitration component 660 receives the potential response data 643a-n (output by the language model shortlister component 640) at the response prompt generation component 910. The response prompt generation component 910 may further receive the user input data 127, the personalized context data 667 (from the language model shortlister component 640 or the personalized context component 665) and the context data 705.

The personalized context data 667 may represent one or more contextual signals associated with the user 105, such as information associated with a user profile of the user 105 (e.g., user ID, user behavioral information, user preferences, age, gender, historical user interaction data, devices associated with the user profile, etc.), which may be determined using, for example, a user recognition component 1095. In some embodiments, an indication of the user 105 and/or user profile may be included in the user input data 127 (e.g., as included in the output of the ASR component 1050.). In some embodiments, the personalized context data 667 may include dialog history data representing one or more user inputs and corresponding system-generated responses for a current interaction between the user 105 and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 910 may process the potential response data 643a-n, the user input data 127, context data 705, and the personalized context data 667 (and, optionally, the further information received from the language model shortlister component 640) to generate prompt data 915 representing a prompt for input to the response language model 920. In some embodiments, the prompt data 915 may be a directive for the response language model 920 to determine whether one or more of the potential responses represented in the potential response data 643a-n are responsive to the user input given the other information (e.g., the personalized context data 667, the context data 705, the potential responses associated with the previous tasks (e.g., previous action response data) associated with the user input, and the user input data 127) included in the prompt data 915. The prompt data may further be a directive for the response language model 920 to, if the response language model 920 determines that one or more of the potential responses are responsive to the user input, cause performance of the one or more corresponding actions (e.g., the one or more potential actions included in the selected responses) and/or cause the system 100 to inform the user 105 of the one or more selected responses. For example, in some embodiments, prompt data 915 may further direct the response language model 920 to generate a natural language summary of the one or more selected responses determined to be responsive to the user input. The prompt data 915 may direct the response language model 920 to cause the system 100 to output the natural language summary to the user 105.

In some embodiments, the prompt data 915 may further be a directive for the response language model 920 to, if the response language model 920 determines that none of the potential responses are responsive to the user input, generate a request for additional information from a component of the system 100 and/or the user 105. As discussed above, the additional information may be any information usable to determine and/or perform an action responsive to the user input (e.g., to resolve an ambiguity associated with the user input and/or a task(s) associated with the user input).

The response language model 920 processes the prompt data 915 to generate the responsive output data 662 representing the one or more selected responses determined to be responsive to the user input, the natural language summary of the one or more selected responses, and/or the request for additional information.

If the response language model 920 determines that one or more of the potential responses are responsive to the user input, the response language model 920 may generate the responsive output data 662 to represent the one or more selected responses or a natural language summary of the one or more selected responses to be output to the user. For example, based on processing the first example prompt data above, the response language model 920 may select one of the potential responses (e.g., the potential responses from skill component A (e.g., a weather skill component)) determined to be responsive to the user input to generate responsive output data 662a: {"It is currently 70 degrees, with a high of 75 and a low of 68,"} or the like. For further example, based on processing the first example prompt data provided above, the response language model 920 may select more than one of the potential responses (e.g., the potential responses from both the skill component A and skill component B) determined to be responsive to the user input and generate a summary of the selected responses to generate responsive output data 662b: {"It is expected to be mostly sunny today, with a high of 75 and a low of 68, but with a chance of rain in the late afternoon,"} or the like.

As another example, based on processing the second example prompt data provided above, the response language model 920 may select one of the potential responses (e.g., the potential response from Component A (e.g., the personalized context component 665) representing that the user ordered Brooklyn style pizza from [Pizza Company 1 Name]) determined to be responsive to the user input to generate responsive output data 662c: {"Ok, I will place an order for Brooklyn style pizza from [Pizza Company 1 Name],"} or the like. As a further example, based on processing the second example prompt data provided above, the response language model 920 may select more than one of the potential responses (e.g., the potential responses from both component A and API A) determined to be responsive to the user input and generate a summary of the selected responses to generate the responsive output data 662d: {"Ok, I will place an order for Brooklyn style pizza from [Pizza Company 1 Name] using [Food Ordering Application 1] API,"} or the like.

As such, the response language model 920 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 920 may cause output of the selected responses (e.g., the subset of potential responses) or a natural language summary of the selected responses to the user.

In some embodiments, the response arbitration component 660 may also generate and send a directive to the components, (e.g., API(s), components, agents, etc.) configured to perform the potential actions included in the selected responses to cause performance of the potential actions (or another component of the system 100 configured to cause the components to perform the potential actions, such as the action plan execution component 645, which is discussed in more detail herein below). For example, in instances where the selected responses include a potential action to be performed, the response language model 920 may further cause the corresponding components to perform the potential action (e.g., cause [Food Ordering Application 1] API to order the Brooklyn style pizza from [Pizza Company 1 Name] using [Food Ordering Application 1]). In other embodiments, the system 100 may not generate and/or send the directive until approval to perform the action(s) is received from the user 105.

If the response language model 920 determines that none of the potential responses are responsive to the user input and/or that an ambiguity exists with respect to the user input and/or one or more of the determined tasks, the response language model 920 may generate the responsive output data 662 to represent a request to be output to the user and/or the personalized context component 665. For example, based on processing the first example prompt data provided above, the response language model 920 may determine an ambiguity exists with respect to the size of the pizza to be ordered and may generate the responsive output data 662e: {"What size pizza should I order?",} {"What size pizza does the user usually order?",} or the like to be output to the user and/or sent to the personalized context component 665.

The response language model 920 may send the responsive output data 662 to the compliance component 930, which is configured to determine whether model output data generated by the response language model 920 is appropriate for output to the user 105. In other words, the compliance component 930 processes the responsive output data 662 to determine whether the responsive output data 662 includes any inappropriate/sensitive information that should not be output to the user 105 (e.g., confidential information, offensive language, etc.). In some embodiments, the compliance component 930 may be configured to compare the responsive output data 662 to one or more words determined to be inappropriate/sensitive and should not be output to the user 105. In some embodiments, the compliance component 930 may include/implement an ML model. For example, the ML model may process the responsive output data 662 to determine whether the responsive output data 662 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 930 indicates that the responsive output data 662 includes information that is not appropriate for output to the user 105, the compliance component 930 may cause further processing of the responsive output data 662 by downstream components to halt. In some embodiments, the response arbitration component 660 may cause the response language model 920 to generate new responsive output data to be evaluated by the compliance component 930. For example, the response arbitration component 660 may cause the response prompt generation component 910 to generate new prompt data, which may include the prompt data 915, the responsive output data 662, and an indication that the responsive output data 662 is not appropriate for output to the user 105. The new prompt data may be a directive to generate new model output data that is appropriate for output to the user 105.

If the output of the compliance component 930 indicates that the responsive output data 662 are appropriate for output to the user, the compliance component 930 may send the responsive output data 662 to the output routing component 940. The output routing component 940 processes the responsive output data 662 to determine one or more components that are to be caused to process in response to the responsive output data 662. In other words, the output routing component 940 parses the responsive output data 662 to determine one or more components that the responsive output data 662 is to be routed to (or that are to be caused to process based on the responsive output data 662).

For example, in an instance where the response language model 920 determines that one or more of the potential responses are responsive to the user input and generates the responsive output data 662 including the one or more selected responses (or a natural language summary of the one or more selected responses)/the request for additional information, the output routing component 940 may parse the responsive output data 662 to determine the selected responses/the natural language summary and send the responsive output data 662 to a component configured to generate corresponding data to be output to the user 105. For example, the output routing component 940 may send the responsive output data 662 to the TTS component 1056, which may process as described herein above to generate output audio data including synthesized speech corresponding to the responsive output data 662, which the system 100 may send to the user device 110 for output to the user 105. In some embodiments, the system 100 may further include a component configured to generate visual output data (e.g., output image and/or video data) corresponding to the responsive output data 662, which may be sent to the user device 110 to be output to the user.

For further example, in embodiments where the responsive output data 662 includes selected responses (e.g., the responsive output data 662) that include one or more potential actions to be performed, the output routing component 940 may process as described herein above to determine the one or more selected responses/the natural language summary and send the responsive output data 662 to the one or more components associated with the selected responses. In such embodiments, the responsive output data 662 may further include a directive for the one or more components to perform the potential actions corresponding to the selected responses. For example, in some embodiments, the components corresponding to the potential responses included in the potential response data 643*a-n* may, after generating the potential responses, suspend processing required to perform the potential action included in the potential responses and await a directive from the system

100 to perform the potential action. As such, the output routing component 940 may include the directive in the responsive output data 662 to cause the component to perform the potential action. In some embodiments, the output routing component 940 may generate an API call configured to cause the component to perform the action.

In some embodiments, where the responsive output data 662 includes selected responses that include one or more potential actions to be performed, the responsive output data 662 may further request authorization from the user 105 to perform the one or more potential actions responsive to the user input. After receiving the request authorization (e.g., via a subsequent user input) the response arbitration component 660 may generate and send the corresponding directive (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 660 may use such data as authorization to perform the one or more potential actions. For example, the user 105 may have previously provided authorization for a set of actions (e.g., turning on outside lights). Thereafter, the system 100 may determine the one or more potential actions to be performed in response to the user input data 127. If the system 100 determines that the one or more actions are included in the set of actions previously authorized by the user 105, the system 100 may not ask for further authorization prior to causing the one or more potential actions to be performed.

For further example, in an instance where the response language model 920 generates the responsive output data 662 including a request for additional information (in response to the response language model 920 determining that none of the potential responses are responsive to the user input and/or an ambiguity exists with respect to the user input and/or one or more of the tasks), which may be determined by the output routing component 940 based on, for example, the responsive output data 662 including a question, the output routing component 940 may parse the responsive output data 662 to determine whether the request for additional information is to be sent to the personalized context component 665 and/or output to the user 105. In some embodiments, the response language model 920 may include in the responsive output data 662 an indication of whether the request for additional information should be sent to the personalized context component 665 and/or output to the user 105. In some embodiments, unless otherwise indicated in the responsive output data 662, the output routing component 940 may determine to send the request for additional information to the personalized context component 665 prior to outputting the request for additional information to the user 105. In the instance where the personalized context component 665 is unable to resolve the ambiguity (or a component of the system 100 is unable to resolve the ambiguity using the personalized context data generated by the personalized context component 665), the output routing component 940 may determine the request for additional information is to be output to the user 105.

In some embodiments, the response arbitration component 660 may be configured to further process data representing a potential response to the user input that is generated by one or more other components of the system 100 not included in the language model orchestrator component 630. For example, the response arbitration component 660 may further receive data from an orchestrator component 1030

(discussed in detail herein below with respect to FIG. 10) representing a potential response to the user input (e.g., the output of the skill component 1054), where the orchestration of the processing performed to generate the potential response was performed by the orchestrator component 1030, rather than the language model orchestrator component 630. In such embodiments, the response arbitration component 660 may be further configured to arbitrate between first potential responses received as a result of the processing of the language model orchestrator component 630 and second potential responses received as a result of the processing of the orchestrator component 1030. As discussed above, the response arbitration component 660 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1030 may be included in the potential response data 643*a-n*. For example, the orchestrator component 1030 may be determined to be configured to perform a function (e.g., cause another component(s) to perform a function) potentially relevant to the user input such that the language model shortlister component 640 may cause the orchestrator component 1030 to generate potential responses potentially responsive to the user input, which may be included in the potential response data 643*a-n* sent to the response arbitration component 660.

In some embodiments, the language models 720, 740, 840, 920 may be fine-tuned to perform a particular task(s). Fine-tuning of the language models 720, 740, 840, 920 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the task determination language model 720, the task selection language model 740, and/or the shortlister language model 840 indicates that additional information is needed to complete a first task associated with a user input, a request for the additional information may be sent to the personalized context component 665. Thereafter, the task determination language model 720, the task selection language model 740, and/or the shortlister language model 840 may continue to process to complete their configured operations. For example, while the personalized context component 665 is processing to determine the additional information, the system 100 may begin processing with respect to a second task associated with the user input. Thereafter, the output of the personalized context component 665 may be sent to the response arbitration component 660 such that once the response arbitration component 660 receives the output of the language model shortlister component 640, the response arbitration component 660 may resolve the ambiguity that resulted in the request for additional information in order to generate the responsive output data 662. For further example, if the user input data 127 is generated to include the natural language representation of the user input, but the processing required to determine the corresponding contextual signals (e.g., weather data, time of data, dialog history, device information, etc.) is yet to be completed, the task generation component 635 may begin processing with respect to the natural language representation of the user input. Once the corresponding contextual signals have been generated, the task generation component 635 may begin processing with respect to the contextual signals and may update downstream components with the result of the processing with respect to the contextual signals.

As another example, if the task generation component 635 determines that more than one task is to be completed to perform an action responsive to a user input, and the language model shortlister component 640 processes as described herein above to cause one or more components to generate potential responses with respect to a first task of the more than one tasks, the language model shortlister component 640 may send the potential responses (and a representation of the user input and the current task) to the response arbitration component 660 to process as described herein above with respect to those potential responses while the system 100 (e.g., the task generation component 635 and/or the language model shortlister component 640) completes processing with respect to the remaining tasks of the one or more tasks. Therefore, the response arbitration component 660 may process as described herein to select between the potential responses associated with the first task while the potential responses associated with one or more of the remaining tasks is completed. As such, the response arbitration component 660 may only need to arbitrate between the potential responses associated with the first task that were previously selected by the response arbitration component 660 as being responsive to the first task when the response arbitration component 660 later processes with respect to further potential responses associated with further tasks.

As a further example, if the API retriever component 160 determines (e.g., with a confidence value that meets or exceeds a particular threshold) that a particular API or component description should be included in the relevant API data, the API retriever component 160 may provide the corresponding relevant API data to the shortlister prompt generation component 810 so that the shortlister prompt generation component 810 may begin processing with respect to the relevant API data while the API retriever component 160 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

Figure 10:
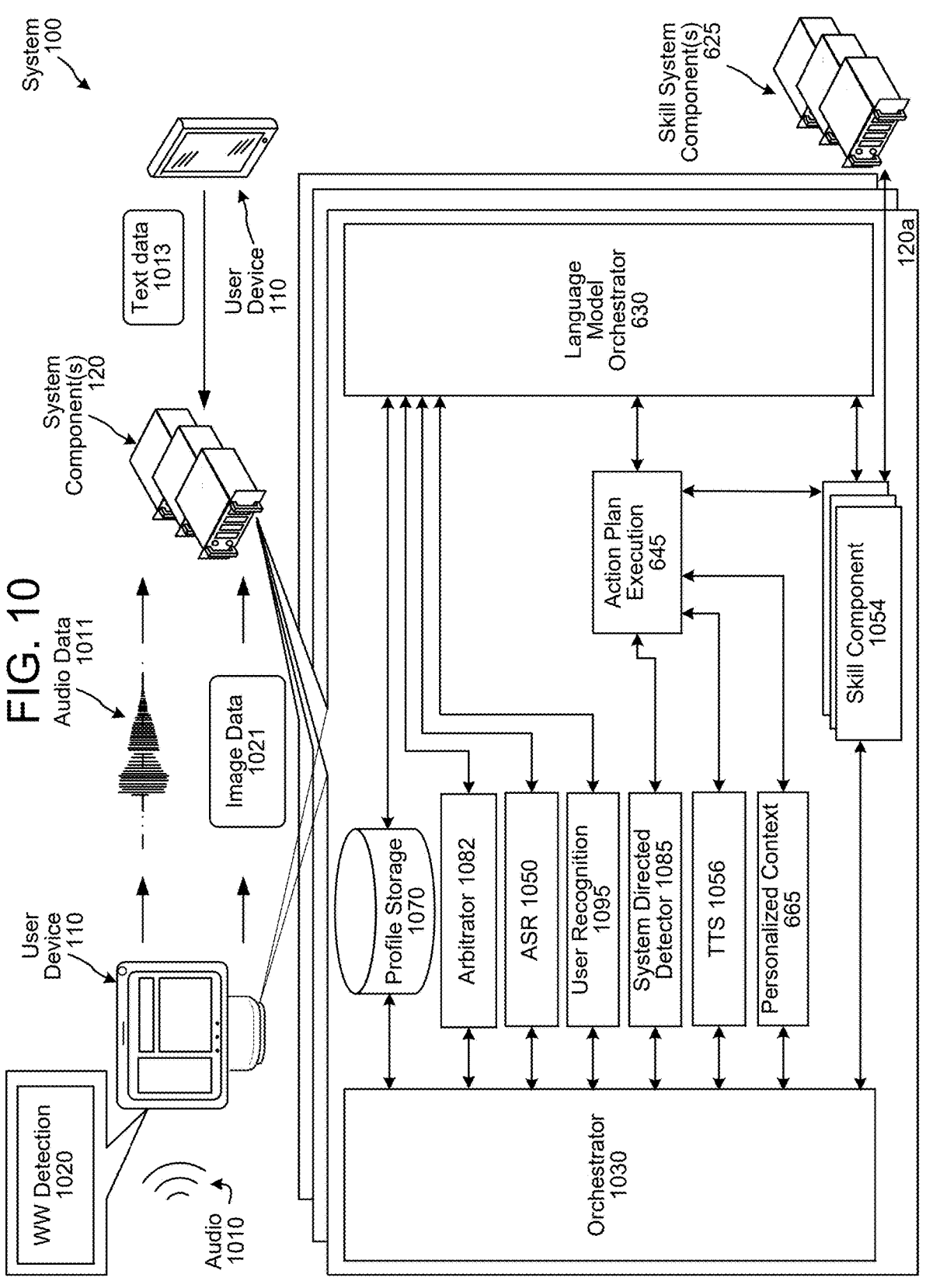
FIG. 10 is a conceptual diagram illustrating components of the system, according to embodiments of the present disclosure.

The system 100 may operate using various components as described in FIG. 10. The various components may be located on same or different physical devices. Communication between various components may occur directly or across a network(s) 199. The user device 110 may include audio capture component(s), such as a microphone or array of microphones of a user device 110, captures audio 1010 and creates corresponding audio data. Once speech is detected in audio data representing the audio 1010, the user device 110 may determine if the speech is directed at the user device 110/system component(s). In at least some embodiments, such determination may be made using a wakeword detection component 1020. The wakeword detection component 1020 may be configured to detect various wakewords. In at least some examples, each wakeword may correspond to a name of a different digital assistant. An example wakeword/digital assistant name is "Alexa." In another example, input to the system may be in form of text data 1013, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data 1021 representing those image(s) to the system component(s). The image data 1021 may include raw image data or image data processed by the user device 110 before sending to the system component(s). The image data 1021 may be used in various manners by different components of the system to perform operations such as determining whether a user is directing an utterance to the system, interpreting a user command, responding to a user command, etc.

The wakeword detection component 1020 of the user device 110 may process the audio data, representing the audio 1010, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1010, is analyzed to determine if specific characteristics of the audio data match preconfigured acoustic waveforms, audio signatures, or other data corresponding to a wakeword.

Thus, the wakeword detection component 1020 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context data, either by stacking frames within a context window for DNN or using RNN. Follow-on posterior threshold tuning or smoothing is applied for decision making. Other techniques for wakeword detection, such as those known in the art, may also be used.

Once the wakeword is detected by the wakeword detection component 1020 and/or input is detected by an input detector, the user device 110 may "wake" and begin transmitting audio data 1011, representing the audio 1010, to the system component(s) 120. The audio data 1011 may include data corresponding to the wakeword; in other embodiments, the portion of the audio corresponding to the wakeword is removed by the user device 110 prior to sending the audio data 1011 to the system component(s) 120. In the case of touch input detection or gesture-based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1020 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 1054 of one or more system component(s) 120.

The user device 110/system component(s) may also include a system directed input detector 1085. The system directed input detector 1085 may be configured to determine whether an input to the system (for example speech, a gesture, etc.) is directed to the system or not directed to the system (for example directed to another user, etc.). The system directed input detector 1085 may work in conjunction with the wakeword detection component 1020. If the system directed input detector 1085 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1085 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 1085 is determining whether an input is potentially device directed. For example, the system may output an orange indicator while considering an input and may output a green indicator if a system directed input is detected. Other such configurations are possible.

Upon receipt by the system component(s) 120, the audio data 1011 may be sent to an orchestrator component 1030 and/or the language model orchestrator component 630. The orchestrator component 1030 may include memory and logic that enables the orchestrator component 1030 to transmit various pieces and forms of data to various components of the system, as well as perform other operations as described herein. In some embodiments, the orchestrator component 1030 may optionally be included in the system component(s) 120. In embodiments where the orchestrator component 1030 is not included in the system component(s) 120, the audio data 1011 may be sent directly to the language model orchestrator component 630. Further, in such embodiments, each of the components of the system component(s) 120 may be configured to interact with the language model orchestrator component 630, the action plan execution component 645, and/or the API provider component.

In some embodiments, the system component(s) 120 may include an arbitrator component 1082, which may be configured to determine whether the orchestrator component 1030 and/or the language model orchestrator component 630 are to process with respect to the audio data 1011. In some embodiments, the language model orchestrator component 630 may be selected to process with respect to the audio data 1011 only if the user 105 associated with the audio data 1011 (or the user device 110 that captured the audio 1010) has previously indicated that the language model orchestrator component 630 may be selected to process with respect to user inputs received from the user 105.

In some embodiments, the arbitrator component 1082 may determine the orchestrator component 1030 and/or the language model orchestrator component 630 are to process with respect to the audio data 1011 based on metadata associated with the audio data 1011. For example, the arbitrator component 1082 may be a classifier configured to process a natural language representation of the audio data 1011 (e.g., output by the ASR component 1050) and classify the corresponding user input as to be processed by the orchestrator component 1030 and/or the language model orchestrator component 630. For further example, the arbitrator component 1082 may determine whether the device from which the audio data 1011 is received is associated with an indicator representing the audio data 1011 is to be processed by the orchestrator component 1030 and/or the language model orchestrator component 630. As an even further example, the arbitrator component 1082 may determine whether the user (e.g., determined using data output from the user recognition component 1095) from which the audio data 1011 is received is associated with a user profile including an indicator representing the audio data 1011 is to be processed by the orchestrator component 1030 and/or the language model orchestrator component 630. As another example, the arbitrator component 1082 may determine whether the audio data 1011 (or the output of the ASR component 1050) corresponds to a request representing that the audio data 1011 is to be processed by the orchestrator component 1030 and/or the language model orchestrator component 630 (e.g., a request including "let's chat" may represent that the audio data 1011 is to be processed by the language model orchestrator component 630).

In some embodiments, if the arbitrator component 1082 is unsure (e.g., a confidence score corresponding to whether the orchestrator component 1030 and/or the language model orchestrator component 630 is to process is below a threshold), then the arbitrator component 1082 may send the audio data 1011 to both of the orchestrator component 1030 and the language model orchestrator component 630. In such embodiments, the orchestrator component 1030 and/or the language model orchestrator component 630 may include further logic for determining further confidence scores during processing representing whether the orchestrator component 1030 and/or the language model orchestrator component 630 should continue processing, as is discussed further herein below.

The arbitrator component 1082 may send the audio data 1011 to an ASR component 1050. In some embodiments, the component selected to process the audio data 1011 (e.g., the orchestrator component 1030 and/or the language model orchestrator component 630) may send the audio data 1011 to the ASR component 1050. The ASR component 1050 may transcribe the audio data 1011 into text data. The text data output by the ASR component 1050 represents one or more than one (e.g., in the form of an N-best list) ASR hypotheses representing speech represented in the audio data 1011. The ASR component 1050 interprets the speech in the audio data 1011 based on a similarity between the audio data 1011 and pre-established language models. For example, the ASR component 1050 may compare the audio data 1011 with models for sounds (e.g., acoustic units such as phonemes, senons, phones, etc.) and sequences of sounds to identify words that match the sequence of sounds of the speech represented in the audio data 1011. The ASR component 1050 sends the text data generated thereby to the arbitrator component 1082, the orchestrator component 1030, and/or the language model orchestrator component 630. In instances where the text data is sent to the arbitrator component 1082, the arbitrator component 1082 may send the text data to the component selected to process the audio data 1011 (e.g., the orchestrator component 1030 and/or the language model orchestrator component 630). The text data sent from the ASR component 1050 to the arbitrator component 1082, the orchestrator component 1030, and/or the language model orchestrator component 630 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 1030 may cause a NLU component (not shown) to perform processing with respect to the ASR data generated by the ASR component 1050. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 110, the system component(s) 120, a skill component 1054, a skill system component(s) 625, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 110. In another example, if the ASR data corresponds to "turn off the lights," the NLU component may determine an intent that the system turn off lights associated with the device 110 or the user 105. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 1030. The orchestrator component 1030 may forward the NLU results data to a skill component(s) 1054. If the NLU results data includes a single NLU hypothesis, the NLU component and the orchestrator component 1030 may direct the NLU results data to the skill component(s) 1054 associated with the NLU hypothesis. If the NLU results data includes an N-best list of NLU hypotheses, the NLU component and the orchestrator component 1030 may direct the top scoring NLU hypothesis to a skill component(s) 1054 associated with the top scoring NLU hypothesis. The system may also include a post-NLU ranker which may incorporate other information to rank potential interpretations determined by the NLU component.

In some embodiments, after determining that the orchestrator component 1030 and/or the language model orchestrator component 630 should process with respect to the user input data 127, the arbitrator 1082 may be configured to periodically determine whether the orchestrator component 1030 and/or the language model orchestrator component 630 should continue processing with respect to the user input data 127. For example, after a particular point in the processing of the orchestrator component 1030 (e.g., after performing NLU, prior to determining a skill component 1054 to process with respect to the user input data 127, prior to performing an action responsive to the user input, etc.) and/or the language model orchestrator component 630 (e.g., after selecting a task to be completed, after receiving the action response data from the one or more components, after completing a task, prior to performing an action responsive to the user input, etc.) the orchestrator component 1030 and/or the language model orchestrator component 630 may query the arbitrator component 1082 has determined that the orchestrator component 1030 and/or the language model orchestrator component 630 should halt processing with respect to the user input data 127. As discussed above, the system 100 may be configured to stream portions of data associated with processing with respect to a user input to the one or more components such that the one or more components may begin performing their configured processing with respect to that data as soon as it is available to the one or more components. As such, the arbitrator component 1082 may cause the orchestrator component 1030 and/or the language model orchestrator component 630 to begin processing with respect to a user input as soon as a portion of data associated with the user input data 127 is available (e.g., the ASR data, context data, output of the user recognition component 1095. Thereafter, once the arbitrator component 1082 has enough data to perform the processing described herein above to determine whether the orchestrator component 1030 and/or the language model orchestrator component 630 is to process with respect to the user input, the arbitrator component 1082 may inform the corresponding component (e.g., the orchestrator component 1030 and/or the language model orchestrator component 630) to continue/halt processing with respect to the user input at one of the logical checkpoints in the processing of the orchestrator component 1030 and/or the language model orchestrator component 630.

As discussed herein above, in some embodiments, the language model shortlister component 640 (e.g., via the API retriever component 160 and/or the shortlister language model 840) may be configured to select the orchestrator component 1030 to process with respect to the user input and/or a current task to return action response data (e.g., the action response data 658a) representing a response to the user input/current task or a description of an action the orchestrator component 1030 may cause to be performed in response to the user input/current task. As such, in some embodiments, although the language model orchestrator component 630 is determined to process with respect to a user input, the language model orchestrator component 630 may determine, during such processing, that the orchestrator component 1030 should process with respect to the user input.

A skill system component(s) 625 may communicate with a skill component(s) 1054 within the system component(s) 120 directly with the orchestrator component 1030 and/or the action plan execution component 645, or with other components. A skill system component(s) 625 may be configured to perform one or more actions. An ability to perform such action(s) may sometimes be referred to as a "skill." That is, a skill may enable a skill system component(s) 625 to execute specific functionality in order to provide data or perform some other action requested by a user. For example, a weather service skill may enable a skill system component(s) 625 to provide weather information to the system component(s) 120, a car service skill may enable a skill system component(s) 625 to book a trip with respect to a taxi or ride sharing service, an order pizza skill may enable a skill system component(s) 625 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 1054 dedicated to interacting with the skill system component(s) 625. Unless expressly stated otherwise, reference to a skill, skill device, or skill component may include a skill component 1054 operated by the system component(s) 120 and/or skill operated by the skill system component(s) 625. Moreover, the functionality described herein as a skill or skill may be referred to using many different terms, such as an action, bot, app, or the like. The skill component 1054 and or skill system component(s) 625 may return output data to the orchestrator component 1030.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1056. The TTS component 1056 may generate audio data (e.g., synthesized speech) from text data using one or more different methods. Text data input to the TTS component 1056 may come from a skill component 1054, the orchestrator component 1030, or another component of the system. In one method of synthesis called unit selection, the TTS component 1056 matches text data against a database of recorded speech. The TTS component 1056 selects matching units of recorded speech and concatenates the units together to form audio data. In another method of synthesis called parametric synthesis, the TTS component 1056 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 1011 representing the commands to the system component(s) 120 for processing, after which the system component(s) 120 may return output data that can cause the user device 110 to engage its camera.

The system component(s) 120/the user device 110 may include a user recognition component 1095 that recognizes one or more users using a variety of data. However, the disclosure is not limited thereto, and the user device 110 may include the user recognition component 1095 instead of and/or in addition to the system component(s) 120 without departing from the disclosure.

The user recognition component 1095 may take as input the audio data 1011 and/or text data output by the ASR component 1050. The user recognition component 1095 may perform user recognition by comparing audio characteristics in the audio data 1011 to stored audio characteristics of users. The user recognition component 1095 may also perform user recognition by comparing biometric data (e.g., fingerprint data, iris data, etc.), received by the system in correlation with the present user input, to stored biometric data of users assuming user permission and previous authorization. The user recognition component 1095 may further perform user recognition by comparing image data (e.g., including a representation of at least a feature of a user), received by the system in correlation with the present user input, with stored image data including representations of features of different users. The user recognition component 1095 may perform additional user recognition processes, including those known in the art.

The user recognition component 1095 determines scores indicating whether user input originated from a particular user. For example, a first score may indicate a likelihood that the user input originated from a first user, a second score may indicate a likelihood that the user input originated from a second user, etc. The user recognition component 1095 also determines an overall confidence regarding the accuracy of user recognition operations.

Output of the user recognition component 1095 may include a single user identifier corresponding to the most likely user that originated the user input. Alternatively, output of the user recognition component 1095 may include an N-best list of user identifiers with respective scores indicating likelihoods of respective users originating the user input. The output of the user recognition component 1095 may be used to inform processing of the arbitrator component 1082, the orchestrator component 1030, and/or the language model orchestrator component 630 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1070 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1070 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1070 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 10 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure.

In at least some embodiments, the system component(s) may receive the audio data 1011 from the user device 110, to recognize speech corresponding to a spoken input in the received audio data 1011, and to perform functions in response to the recognized speech. In at least some embodiments, these functions involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may direct the user device 110 to output an audible response (e.g., using TTS processing performed by an on-device TTS component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

In at least some embodiments, a hybrid selector, of the user device 110, may send the audio data 1011 to the wakeword detection component 1020. If the wakeword detection component 1020 detects a wakeword in the audio data 1011, the wakeword detection component 1020 may send an indication of such detection to the hybrid selector. In response to receiving the indication, the hybrid selector may send the audio data 1011 to the system component(s) and/or the ASR component of the user device 110. The wakeword detection component 1020 may also send an indication, to the hybrid selector, representing a wakeword was not detected. In response to receiving such an indication, the hybrid selector may refrain from sending the audio data 1011 to the system component(s) and may prevent the ASR component of the user device 110 from further processing the audio data 1011. In this situation, the audio data 1011 can be discarded.

The user device 110 may conduct its own speech processing using on-device language processing components, such as an ASR component, similar to the manner discussed herein with respect to the ASR component 1050 of the system component(s). The user device 110 may also internally include, or otherwise have access to, other components such as one or more skill components capable of executing commands based on the output of an orchestrator component, a language model orchestrator component, or other results determined by the user device 110/system component(s) (which may operate similarly to skill components 1054), an arbitrator component (configured to process in a similar manner to that discussed herein above with respect to the arbitrator component 1082), an action plan execution component (configured to process in a similar manner to that discussed herein with respect to the action plan execution component 645), a personalized context component (configured to process in a similar manner to that discussed herein with respect to the personalized context component 665), a user recognition component (configured to process in a similar manner to that discussed herein with respect to the user recognition component 1095 of the system component(s)), profile storage (configured to store similar profile data to that discussed herein with respect to the profile storage 1070 of the system component(s)), or other components. In at least some embodiments, the profile storage may only store profile data for a user or group of users specifically associated with the user device 110. Similar to as described above with respect to skill component 1054, a skill component of the user device 110 may communicate with a skill system component(s) 625. The user device 110 may also have its own TTS component, which may operate similarly to TTS component 1056.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector, of the user device 110, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1011 to pass to the system component(s) while also receiving (e.g., intercepting) this audio data 1011 and sending the audio data 1011 to the HEC.

In at least some embodiments, the hybrid selector may further include a local request orchestrator (LRO) configured to notify the ASR component of the user device 110 about the availability of new audio data 1011 that represents user speech, and to otherwise initiate the operations of local language processing when new audio data 1011 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 1011 is received, the HP may allow the audio data 1011 to pass through to the system component(s) and the HP may also input the audio data 1011 to the on-device ASR component by routing the audio data 1011 through the HEC of the hybrid selector, whereby the LRO notifies the on-device ASR component of the audio data 1011. At this point, the hybrid selector may wait for response data from either or both of the system component(s) or the local language processing components. However, the disclosure is not limited thereto, and in some examples the hybrid selector may send the audio data 1011 only to the local ASR component without departing from the disclosure. For example, the user device 110 may process the audio data 1011 locally without sending the audio data 1011 to the system component(s).

The local ASR component is configured to receive the audio data 1011 from the hybrid selector XXE24, and to recognize speech in the audio data 1011. The user device 110 and/or the system component(s) may associate a unique identifier with each natural language user input. The user device 110 may include the unique identifier when sending the audio data 1011 to the system component(s), and the response data from the system component(s) may include the unique identifier to identify which natural language user input the response data corresponds.

In at least some embodiments, the user device 110 may include, or be configured to use, one or more skill components that may work similarly to the skill component(s) 1054 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 110 may be in communication with one or more skill system component(s) 625. For example, a skill system component(s) 625 may be located in a remote environment (e.g., separate location) such that the user device 110 may only communicate with the skill system component(s) 625 via the network(s) 199. However, the disclosure is not limited thereto. For example, in at least some embodiments, a skill system component(s) 625 may be configured in a local environment (e.g., home server and/or the like) such that the user device 110 may communicate with the skill system component(s) 625 via a private network, such as a local area network (LAN).

A skill system component(s) 625 may communicate with a skill component(s) 1054 within the system component(s) 120 directly with the orchestrator component 1030 and/or the action plan execution component 645, or with other components. A skill system component(s) 625 may be configured to perform one or more actions. An ability to perform such action(s) may sometimes be referred to as a "skill." That is, a skill may enable a skill system component(s) 625 to execute specific functionality in order to provide data or perform some other action requested by a user. For example, a weather service skill may enable a skill system component(s) 625 to provide weather information to the system component(s) 120, a car service skill may enable a skill system component(s) 625 to book a trip with respect to a taxi or ride sharing service, an order pizza skill may enable a skill system component(s) 625 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 1054 dedicated to interacting with the skill system component(s) 625. Unless expressly stated otherwise, reference to a skill, skill device, or skill component may include a skill component 1054 operated by the system component(s) 120 and/or skill operated by the skill system component(s) 625. Moreover, the functionality described herein as a skill or skill may be referred to using many different terms, such as an action, bot, app, or the like. The skill component 1054 and or skill system component(s) 625 may return output data to the orchestrator component 1030.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 11 is a block diagram conceptually illustrating a user device 110 that may be used with the system. FIG. 12 is a block diagram conceptually illustrating example components of a remote device, such as the natural language command processing system component(s), which may assist with ASR processing, NLU processing, etc., and a skill system component(s) 625. System component(s) (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/625) may be included in the overall system 100 of the present disclosure, such as one or more natural language processing system component(s) 120 for performing ASR processing, one or more natural language processing system component(s) 120 for performing NLU processing, one or more skill system component(s) 625, etc. In operation, each of these systems may include computer-readable and computer-executable instructions that reside on the respective device (120/625), as will be discussed further below.

Each of these devices (110/120/625) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random-access memory (RAM), non-volatile read only memory (ROM), non-volatile magnetoresistive memory (MRAM), and/or other types of memory. Each device (110/120/625) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/625) may also be connected to removable or external non-volatile memory and/or storage (such as a removable memory card, memory key drive, networked storage, etc.) through respective input/output device interfaces (1102/1202).

Computer instructions for operating each device (110/120/625) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/625) includes input/output device interfaces (1102/1202). A variety of components may be connected through the input/output device interfaces (1102/1202), as will be discussed further below. Additionally, each device (110/120/625) may include an address/data bus (1124/1224) for conveying data among components of the respective device. Each component within a device (110/120/625) may also be directly connected to other components in addition to (or instead of) being connected to other components across the bus (1124/1224).

Referring to FIG. 11, the user device 110 may include input/output device interfaces 1102 that connect to a variety of components such as an audio output component such as a speaker 1112, a wired headset or a wireless headset (not illustrated), or other component capable of outputting audio.

The user device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 1116 for displaying content. The user device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the user device(s) 110, the natural language command processing system component(s), or a skill system component(s) 625 may include their own dedicated processors, memory, and/or storage. Alternatively, one or more of the components of the user device(s) 110, the natural language command processing system component(s), or a skill system component(s) 625 may utilize the I/O interfaces (1102/1202), processor(s) (1104/1204), memory (1106/1206), and/or storage (1108/1208) of the user device(s) 110, natural language command processing system component(s), or the skill system component(s) 625, respectively. Thus, the ASR component 1050 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s), and a skill system component(s) 625, as described herein, are illustrative, and may be located as a stand-alone device or may be included, in whole or in part, as a component of a larger device or system. As can be appreciated, a number of components may exist either on a system component(s) and/or on user device 110. For example, ASR component 1050/XXE50 and TTS component XXK80/XXE80), etc., for example as illustrated in FIGS. 10 and XXE. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
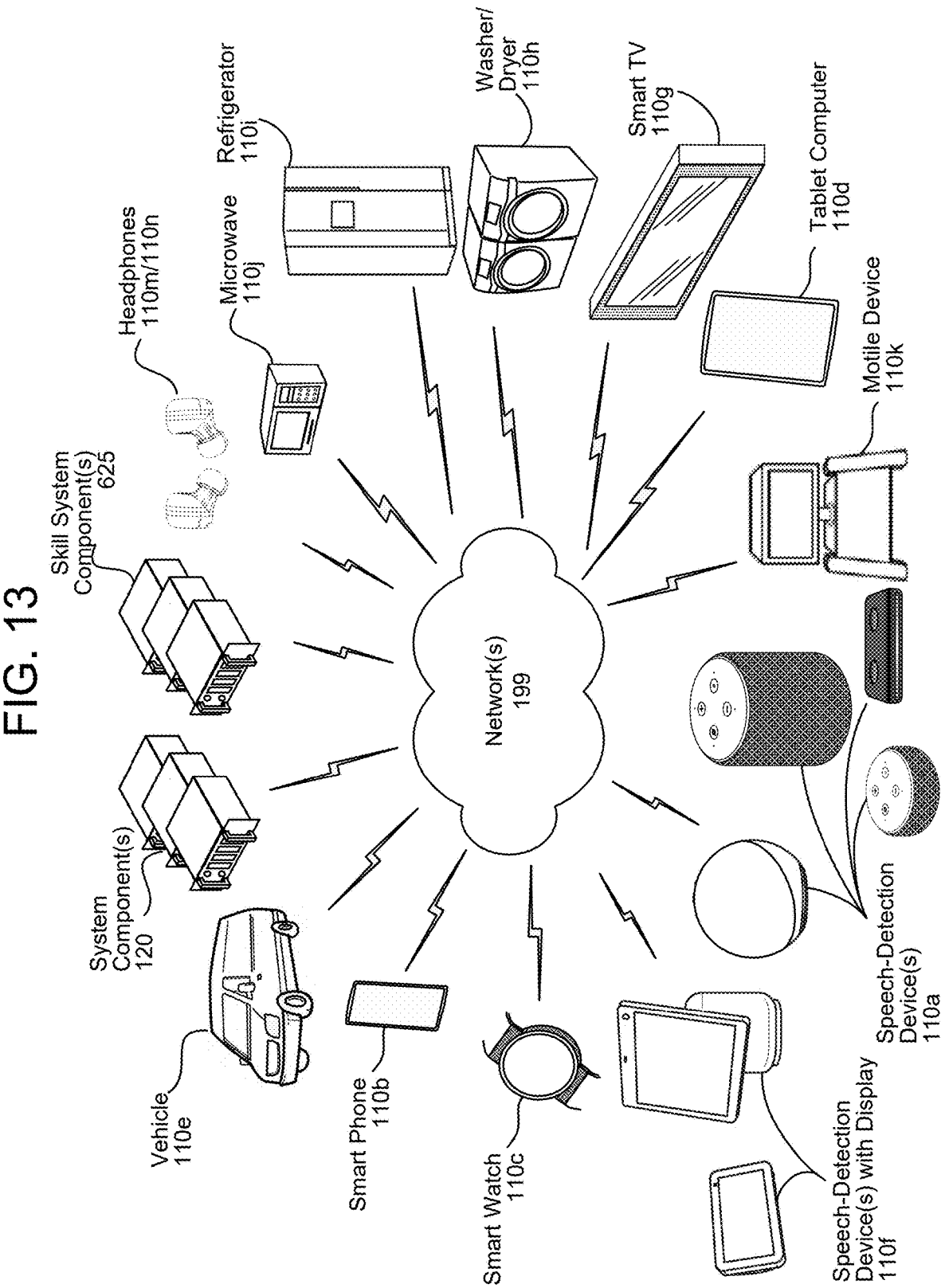
FIG. 13 illustrates an example of a network for use with the overall system, according to embodiments of the present disclosure.

As illustrated in FIG. 13, multiple devices (110a-110n, 120, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 625, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1050, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving a natural language user input requesting performance of a first action;
determining a natural language prompt including the natural language user input and a first request to determine at least one Application Programming Interface (API) call to cause performance of the first action;
processing, using a language model, the natural language prompt to generate a natural language query for an API storage component, the natural language query requesting at least one API call to cause performance of the first action;
in response to the natural language query, receiving, from the API storage component, a ranked list of API calls including at least a first API call;
determining, from first data representing associations between user requested actions and API calls, a second API call capable of performing the first action;
processing the ranked list of API calls and the second API call to determine metric data corresponding to performance of the language model with respect to generation of the natural language query to cause retrieval of the second API call from the API storage component;
based on the metric data satisfying a condition, determining second data including the natural language prompt and the natural language query; and
training the language model using the second data.

2. The computer-implemented method of claim 1, wherein:
receiving the natural language user input comprises receiving the natural language user input requesting performance of the first action and a second action,
determining the natural language prompt comprises determining the natural language prompt to include the first request to determine at least two API calls capable of performing the first action or the second action,
processing the natural language prompt comprises processing, using the language model, the natural language prompt to generate the natural language query requesting at least one API call capable of performing the first action and at least one API call capable of performing the second action, and
receiving the ranked list of API calls comprises receiving the ranked list of API calls including the first API call and a third API call.

3. The computer-implemented method of claim 2, further comprising:
determining, from the first data, a fourth API call capable of performing the second action,
wherein determining the metric data comprises:
determining that the first API call corresponds to the second API call;
determining a first rank associated with the first API call in the ranked list;
determining that the third API call corresponds to the fourth API call;
determining a second rank associated with the third API call in the ranked list; and
determining the metric data based at least on the first rank and the second rank.

4. The computer-implemented method of claim 1, further comprising:
sending, to a first component corresponding to the first API call, a second request based on the first API call;
in response to the second request, receiving, from the first component, third data;
determining output data based at least on the third data, the output data being responsive to the natural language user input;
determining feedback data corresponding to the output data;
determining that the feedback data satisfies a condition; and
based on the feedback data satisfying the condition, determining the metric data.

5. A computer-implemented method comprising:
determining a first prompt including a first request to determine first data corresponding to a first action;
processing, using a language model, the first prompt to generate a first query for a storage component, the first query requesting the first data corresponding to the first action;
in response to the first query, receiving, from the storage component, at least first Application Programming Interface (API) data;
determining second API data corresponding to the first action, the second API data being ground truth data;
determining first performance metrics data based on a first correspondence between the first API data and the second API data; and
based on the first performance metrics data, determining second data including the first prompt and the first query, the second data to be used for training the language model.

6. The computer-implemented method of claim 5, further comprising:
in response to the first query, receiving, from the storage component, a ranked list of API data, the ranked list including the first API data,
wherein determining the first performance metrics data comprises:
determining that the first API data corresponds to the second API data;
determining a rank associated with the first API data; and
determining the first performance metrics data based on the rank.

7. The computer-implemented method of claim 5, further comprising:
determining a second prompt including a second request to determine data corresponding to a second action and a third action;

processing, using the language model, the second prompt to generate a second query for the storage component, the second query requesting at least third data corresponding to the second action and at least fourth data corresponding to the third action;

in response to the second query, receiving, from the storage component, a list of API data including at least third API data and fourth API data;

determining fifth API data corresponding to the second action, the fifth API data being ground truth data;

determining sixth API data corresponding to the third action;

determining second performance metrics data based on a second correspondence between the third API data and the fifth API data and a third correspondence between the fourth API data and the sixth API data; and based on the second performance metrics data, determining fourth data including the second prompt and the second query, the fourth data to be used for training the language model.

8. The computer-implemented method of claim 5, further comprising:

receiving a natural language user input requesting performance of the first action;

determining feedback data associated with the natural language user input;

determining that the feedback data satisfies a condition; and in response to the feedback data satisfying the condition, determining the first performance metrics data.

9. The computer-implemented method of claim 5, further comprising:

sending, to a first component, the first API data;

in response to the first API data, receiving, from the first component, a response indicative of the first API data being invalid;

based on the response, determining negative feedback corresponding to the first query; and in response to determining the negative feedback, determining the first performance metrics data.

10. The computer-implemented method of claim 5, further comprising:

receiving a natural language user input requesting performance of the first action;

determining, based on the first API data, a response to the natural language user input;

processing, using a machine learning model, the natural language user input, the first API data, and the response to determine feedback data corresponding to the natural language user input;

determining that the feedback data satisfies a condition; and based on the feedback data satisfying the condition, determining the first performance metrics data.

11. The computer-implemented method of claim 5, further comprising:

determining the second API data from third data representing associations between user requested actions and API calls.

12. The computer-implemented method of claim 5, further comprising:

determining a second prompt including a second request to determine a response from a knowledge base to a user query;

processing, using the language model, the second prompt to generate a second query for the knowledge base, the second query requesting a response to the user query;

in response to the second query, receiving, from the knowledge base, at least a first response;

determining a second response corresponding to the user query, the second response being ground truth data;

determining second performance metrics data based on a second correspondence between the first response and the second response; and based on the second performance metrics data, determining fourth data including the user query and the second query, the fourth data to be used to train the language model.

13. A system comprising:

at least one processor; and at least one memory including instructions that, when executed by the at least one processor, cause the system to:

determine a first prompt including a first request to determine first data corresponding to a first action;

process, using a language model, the first prompt to generate a first query for a storage component, the first query requesting the first data corresponding to the first action;

in response to the first query, receive, from the storage component, at least first (Application Programming Interface) API data;

determine second API data corresponding to the first action, the second API data being ground truth data;

determine first performance metrics data based on a first correspondence between the first API data and the second API data; and based on the first performance metrics data, determine second data including the first prompt and the first query, the second data to be used for training the language model.

14. The system of claim 13, wherein the at least one memory includes further instructions that, when executed by the at least one processor, further cause the system to:

in response to the first query, receive, from the storage component, a ranked list of API data, the ranked list including the first API data, wherein the instructions that cause the system to determine the first performance metrics data comprises instructions that further cause the system to:

determine that the first API data corresponds to the second API data;

determine a rank associated with the first API data; and determine the first performance metrics data based on the rank.

15. The system of claim 13, wherein the at least one memory includes further instructions that, when executed by the at least one processor, further cause the system to:

determine a second prompt including a second request to determine data corresponding to cause a second action and a third action;

process, using the language model, the second prompt to generate a second query for the storage component, the second query requesting at least third data corresponding to the second action and fourth data corresponding to the third action;

in response to the second query, receive, from the storage component, a list of API data including at least third API data and fourth API data;

determine fifth API data corresponding to the second action, the fifth API data being ground truth data;

determine sixth API data capable of performing the third action, the sixth API data being ground truth data;

determine second performance metrics data based on a second correspondence between the third API data and the fifth API data and a third correspondence between the fourth API data and the sixth API data; and based on the second performance metrics data, determine fourth data including the second prompt and the second query, the fourth data to be used for training the language model.

16. The system of claim 13, wherein the at least one memory includes further instructions that, when executed by the at least one processor, further cause the system to:

receive a natural language user input requesting performance of the first action;

determine feedback data associated with the natural language user input;

determine that the feedback data satisfies a condition; and in response to the feedback data satisfying the condition, determine the first performance metrics data.

17. The system of claim 13, wherein the at least one memory includes further instructions that, when executed by the at least one processor, further cause the system to:

send, to a first component, the first API data;

in response to the first API data, receive, from the first component, a response indicative of the first API data being invalid;

based on the response, determine negative feedback corresponding to the first query; and in response to determining the negative feedback, determine the first performance metrics data.

18. The system of claim 13, wherein the at least one memory includes further instructions that, when executed by the at least one processor, further cause the system to:

receive a natural language user input requesting performance of the first action;

determine, based on the first API data, a response to the natural language user input;

process, using a machine learning model, the natural language user input, the first API data, and the response to determine feedback data corresponding to the natural language user input;

determine that the feedback data satisfies a condition; and based on the feedback data satisfying the condition, determine the first performance metrics data.

19. The system of claim 13, wherein the at least one memory includes further instructions that, when executed by the at least one processor, further cause the system to:

determine the second API data from third data representing associations between user requested actions and API calls.

20. The system of claim 13, wherein the at least one memory includes further instructions that, when executed by the at least one processor, further cause the system to:

determine a second prompt including a second request to determine a response from a knowledge base to a user query;

process, using the language model, the second prompt to generate a second query for the knowledge base, the second query requesting a response to the user query;

in response to the second query, receive, from the knowledge base, at least a first response;

determine a second response corresponding to the user query, the second response being ground truth data;

determine second performance metrics data based on a second correspondence between the first response and the second response; and based on the second performance metrics data, determine fourth data including the user query and the second query, the fourth data to be used to train the language model.

* * * * *